United States Patent [19]
Nagata et al.

[11] Patent Number: 6,060,199
[45] Date of Patent: May 9, 2000

[54] COLOR FILTER SUBSTRATE AND METHOD FOR PRODUCING THE SAME

[75] Inventors: Hisashi Nagata, Nara; Takayuki Shimada, Yamatokoriyama, both of Japan

[73] Assignee: Sharp Kabushiki Kaisha, Osaka, Japan

[21] Appl. No.: 09/137,676

[22] Filed: Aug. 21, 1998

[30] Foreign Application Priority Data

Aug. 22, 1997 [JP] Japan .................................. 9-226855

[51] Int. Cl.⁷ ............................ G02B 5/20; G02F 1/1335
[52] U.S. Cl. ................................................................ 430/7
[58] Field of Search ................................. 430/7; 349/106

[56] References Cited

U.S. PATENT DOCUMENTS 5,365,357  11/1994  Ongawara et al. ...................... 349/106
5,645,963  7/1997  Chang ........................................ 430/7

FOREIGN PATENT DOCUMENTS 58-172685  10/1983  Japan .
4-278901  10/1992  Japan .

*Primary Examiner*—John A. McPherson
*Attorney, Agent, or Firm*—Nixon & Vanderhye, P.C.

[57] ABSTRACT

A method for producing a color filter substrate is provided. The color filter substrate includes a base plate having a first side and a second side opposed to the first side, and a color filter layer provided on the base plate and including at least a first color layer having a plurality of first color portions and a second color layer having a plurality of second color portions. The at least the first color layer and the second color layer including a final color layer. The plurality of first color portions and the plurality of second color portions are respectively adjacent to each other. The method includes the step of forming a color filter layer. The step of forming the color filter layer includes a repetition of the steps of applying a dry film on the base plate from the first side to the second side of the base plate while pressing the dry film by a laminate method; and patterning the dry film applied on the base plate, thereby forming a color layer including a plurality of color portions. The final color layer is formed on at least a part of exposed surface areas extending from the first side to the second side. The dry film for forming the final color layer is applied while expelling from between the dry film and the base plate through the exposed surface areas.

16 Claims, 11 Drawing Sheets

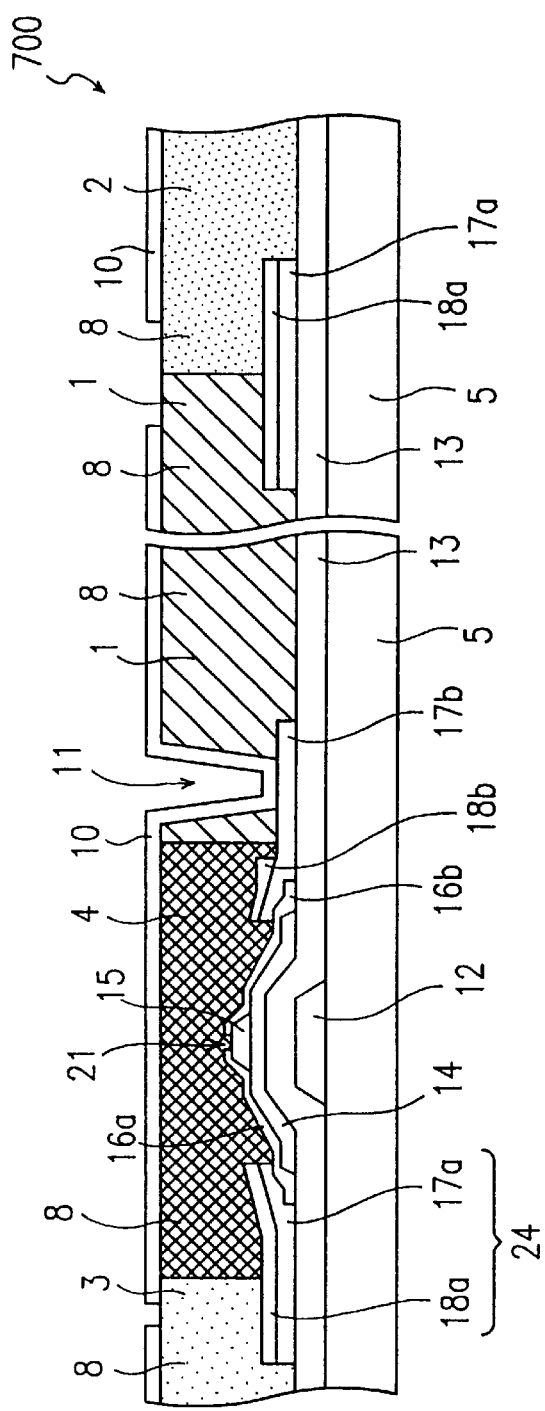
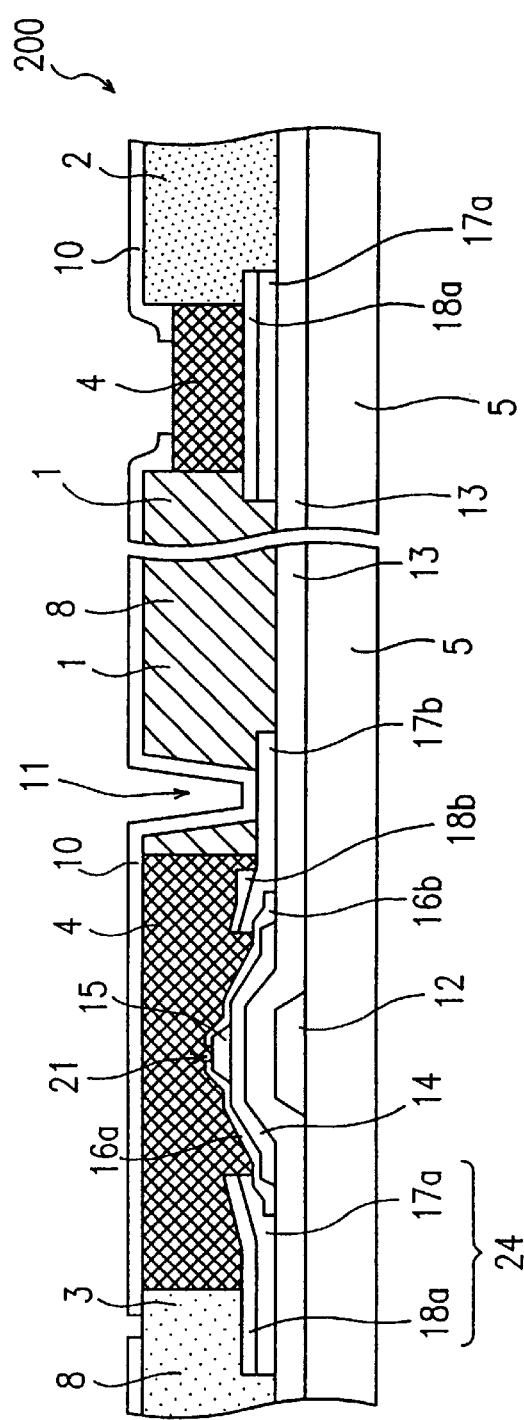
FIG. 3A
FIG. 3B

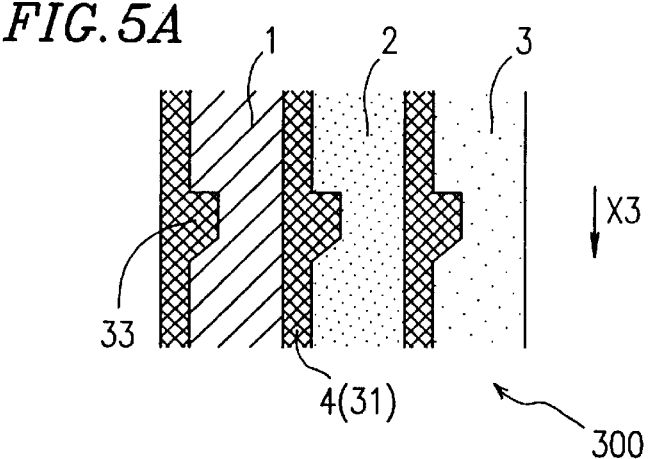
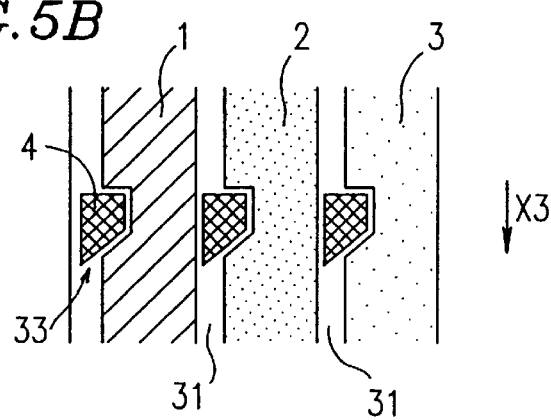
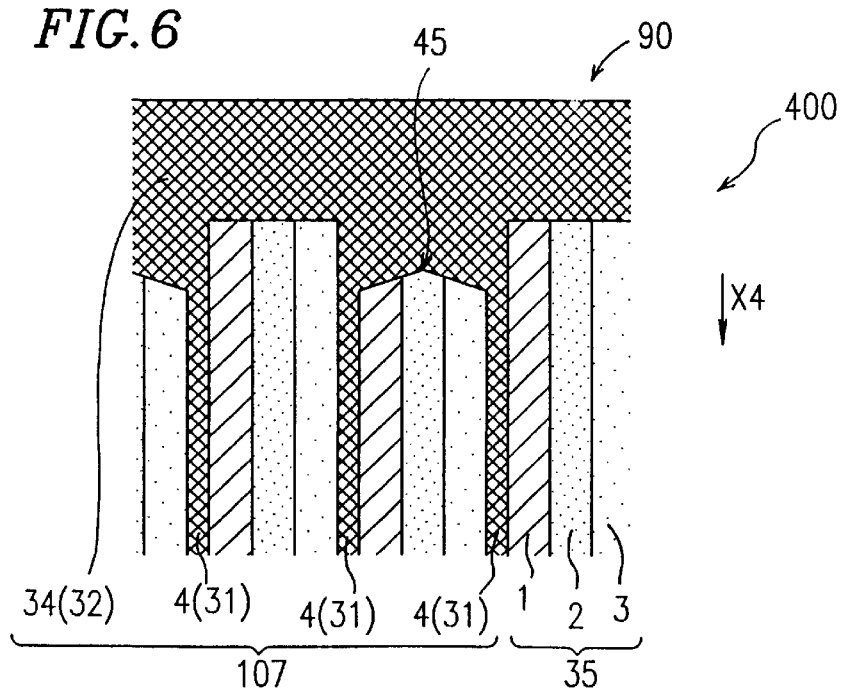

COLOR FILTER SUBSTRATE AND METHOD FOR PRODUCING THE SAME

BACKGROUND OF THE INVENTION

1. Field of the Invention

The present invention relates to a color filter substrate usable for a display device of, for example, TVs, personal computers, wordprocessors and office automation apparatuses, and a method for producing the same.

2. Description of the Related Art

Color filter substrates including a transparent base plate and a color filter layer are conventionally used in flat panel display devices such as liquid crystal display devices.

As methods for producing a color filter substrate, dyeing, electrodeposition, pigment dispersion and the like are generally known. Among these methods, pigment dispersion is in wide use because dyeing and electrodeposition cause the colors to be easily faded and also result in unsatisfactory purity of color.

By the pigment dispersion, photosensitive resin films containing pigments dispersed therein are applied on a base plate and patterned. An exemplary formation process of a color filter substrate by pigment dispersion will be described with reference to FIG. 11.

First, a base plate is washed (block 11a). Next, as shown in block 11b, a two-film chrome layer is formed by sputtering, and a resist is applied thereon. Then, exposure, development and wet etching are sequentially performed, and then the resist is removed. Thus, a layer acting as a black matrix is formed.

As shown in block 11c, a photosensitive resin containing a red pigment dispersed therein is spin-coated on the base plate so as to cover the black matrix, and then pre-baked. Then, the photosensitive resin is treated by exposure, development and pre-baking, thereby forming a red color layer.

As shown in block 11d, a photosensitive resin containing a green pigment dispersed therein is spin-coated on the base plate so as to cover the black matrix and the red color layer, and then pre-baked. Then, the photosensitive resin is treated by exposure, development and pre-baking, thereby forming a green color layer.

As shown in block 11e, a photosensitive resin containing a blue pigment dispersed therein is spin-coated on the base plate so as to cover the black matrix and the red and green color layers, and then pre-baked. Then, the photosensitive resin is treated by exposure, development and pre-baking, thereby forming a blue color layer.

The resultant substrate is inspected (block 11f), washed and then baked (11g). Thus, the color filter substrate is obtained.

As a method for producing a color filter substrate including a color filter containing pigments, a dry film laminate (DFL) method using a dry film is shown in FIG. 12.

First, a base plate is washed (block 12a). Next, as shown in block 12b, a dry film containing a red pigment dispersed therein is laminated on the base plate, and a protection film of the dry film is removed. Then, the dry film is treated by exposure, removal of a cushioning layer and development of a color layer through a photomask, and pre-baking. Thus, a red color layer is formed.

Next, as shown in block 12c, a dry film containing a green pigment dispersed therein is laminated on the base plate so as to cover the red color layer, and a protection film of the dry film is removed. Then, the dry film is treated by exposure, removal of a cushioning layer and development of a color layer through a photomask, and pre-baking. Thus, a green color layer is formed.

Next, as shown in block 12d, a dry film containing a blue pigment dispersed therein is laminated on the base plate so as to cover the red and green color layers, and a protection film of the dry film is removed. Then, the dry film is treated by exposure, removal of a cushioning layer and development of a color layer through a photomask, and pre-baking. Thus, a blue color layer is formed.

Next, as shown in block 12e, a dry film containing a black pigment dispersed therein is laminated on the base plate so as to cover the red, green and blue color layers, and a protection film of the dry film is removed. Then, the dry film is treated by exposure, removal of a cushioning layer and development of a color layer through a photomask, and pre-baking. Thus, a layer acting as a black matrix is formed.

The resultant substrate is inspected (block 12f), washed and then baked (12g). Thus, the color filter substrate is obtained.

The DFL method has the following advantages over the spin-coating described above with reference to FIG. 11:

(1) A uniform desired layer thickness is obtained more easily by merely using a dry film having a desired layer thickness. Since the dry film contains almost no moisture and the color filer is formed in the state of being relatively easily polymerizable, it is not necessary to consider a reduction in the thickness after baking, as is necessary in the case of spin-coating.

(2) Whereas, in the case of spin-coating, only a small part of the material is left on the base plate to be used and the rest is discarded at the time of application, the DFL method allows a significant part of the material to be used. Thus, the material is not wasted.

(3) Since application of a dry film is easier than spin-coating, the production cost is lower.

A color filter substrate obtained in such a manner is generally usable as a counter substrate, which is combined with an active matrix substrate to produce a liquid crystal display device as described in, for example, Japanese Laid-Open Publication No. 58-172685. Alternatively, a color filter layer of the color filter substrate can be provided in an active matrix substrate as described in, for example, Japanese Laid-Open Publication No. 6-242433. In other words, such an active matrix substrate including a color filter layer is obtained by providing an interlayer insulative layer in the active matrix substrate of Japanese Laid-Open Publication No. 58-172685 with the function of a color filter layer. An exemplary active matrix liquid substrate including the color filter layer will be described with reference to FIGS. 2 and 3A. FIG. 2 is a plan view of one picture element area of an active matrix substrate 700. FIG. 3A is a cross-sectional view of the active matrix substrate 700 taken along line A–A' of FIG. 2.

As shown in FIG. 2, an active matrix substrate 700 includes a plurality of gate signal lines 25 acting as scanning lines and a plurality of signal lines 24 acting as signal lines perpendicular to the gate signal lines 25. A plurality of picture element electrodes 10 (only one is shown in FIG. 2) formed of a transparent conductive material are provided in a matrix in the state of being surrounded by the gate signal lines 25 and the source signal lines 24. A plurality of thin film transistors (TFTs) 21 (only one is shown in FIG. 2) are provided at intersections of the gate signal lines 25 and the source signal lines 24.

With reference to FIG. 3A, the cross-sectional structure of the active matrix substrate 700 will be described. For simplicity, the description will be directed to one picture element area. The active matrix substrate 700 includes a transparent insulative base plate 5 (referred to simply as the "base plate"), a gate electrode 12 provided on the base plate 5, a gate insulative layer 13 provided on the base plate 5 so as to cover the gate electrode 12, a semiconductor layer 14 provided on the gate insulative layer 13 above the gate electrode 12, and a channel protection layer 15 provided on a central part of the semiconductor layer 14. The active matrix substrate 700 further includes a source electrode 16*a* and a drain electrode 16*b* provided on the gate insulative layer 13 so as to cover the semiconductor layer 14 and the channel protection layer 15. The source electrode 16*a* and the drain electrode 16*b* are formed of $n^+$-Si and are separated from each other on the channel protection layer 15.

The source electrode 16*a* is connected to the source signal line 24 including a transparent conductive layer 17*a* and a metal layer 18*a* provided on the transparent conductive layer 17*a*. The drain electrode 16*b* is connected to a two-film layer including a transparent conductive layer 17*b* and a metal layer 18*b*. The gate electrode 12 is branched from the gate signal line 25 (FIG. 2). The gate electrode 12, the source electrode 16*a*, the drain electrode 16*b*, the semiconductor layer 14, the channel protection layer 15, and an area of the gate insulative layer 13 below the semiconductor layer 14 are included in the TFT 21. The TFT 21 is driven by a signal inputted to the gate electrode 12 from the gate signal line 25. A voltage from the source signal line 24 is applied to each of the picture element electrode 10 via the source electrode 16*a*.

Returning to FIG. 3A, the active matrix substrate 700 further includes the interlayer insulative layer 8 provided on the gate insulative layer 13 so as to cover the TFT 21, the transparent conductive layers 17*a* and 17*b*, and the metal layers 18*a* and 18*b*. The interlayer insulative layer 8 has a contact hole 11 formed therethrough. The picture element electrode 10 is provided on the interlayer insulative layer 8. The transparent conductive layer 17*b* is extended to below the contact hole 11. An extended part of the transparent conductive layer 17*b* acts as a connection electrode 17*c* (FIG. 2). The picture element electrode 10 is electrically connected to the drain electrode 16*b* through the transparent conductive layer 17*b*.

Referring to FIG. 2 again, a portion of the connection electrode 17*c* is extended to a central part of the picture element electrode 10 substantially in parallel to the source signal line 24 and another portion of the connection electrode 17*c* substantially in parallel to the gate signal line 25 in the central part. In the central part, the connection electrode 17*c* substantially overlaps a storage capacitance line 22 provided in parallel to the gate signal line 25. The overlapping connection electrode 17*c* and storage capacitance line 22 act as electrodes forming a storage capacitance.

As shown in FIG. 3A, the interlayer insulative layer 8 includes a color portion in correspondence with the picture element electrode. In the picture element area shown in FIG. 3A, the interlayer insulative layer 8 includes a red color portion 1 (a green color portion 2 and a blue color portion 3 are also partially shown). The interlayer insulative layer 8 also includes a black color portion 4 on the TFT 21 and the vicinity thereof.

Although not shown, the active matrix substrate 700 further includes an alignment layer of polyimide or the like provided on the interlayer insulative layer 8 so as to cover the picture element electrodes 10. The alignment layer is provided at least in a display area. The alignment layer is provided with an aligning function by rubbing, UV radiation or the like.

Again although not shown, a counter substrate includes a transparent insulative base plate, a transparent counter electrode formed of ITO or the like and provided on the base plate, and an alignment layer provided on the counter electrode. The alignment layer is provided at least in the display area.

The active matrix substrate 700 (FIG. 3A) and the counter substrate are combined together to produce a panel of a liquid crystal display device in, for example, the following conventional manner, which will be discussed generally without reference to drawings.

A sealing material is applied on a surface of one of the substrates along the perimeter thereof (i.e., seal area) except for a liquid crystal injection opening. The sealing material is applied by, for example, printing. On a surface of the active matrix substrate, a conductive material is applied to a signal input terminal for the counter electrode and also spacers are scattered. The two substrates are positionally aligned and assembled together. The sealing material is cured by heating. A liquid crystal material is injected into a space between the two substrates through the liquid crystal injection opening. Thus, a liquid crystal layer is formed. The liquid crystal injection opening is then sealed by a sealing agent.

The liquid crystal layer is optically modulated by the potential difference between each of the picture element electrodes 10 and the counter electrode, and such an optical modulation is visually recognized as a display pattern. As a switching element for selectively driving the picture element electrodes, metal-insulator-metal (MIM) devices are also generally used in lieu of the TFTs 21.

In the active matrix substrate 700, the picture element electrodes 10 overlap the gate signal lines 25 and the source signal lines 24. Such a structure has advantages of: (1) the numerical aperture of the resultant liquid crystal display device is increased, and (2) defective alignment of liquid crystal molecules is prevented since the electric field caused by the signal lines is shielded.

A color filter generally includes a red color layer, a green color layer and a blue color layer as well as a black matrix for preventing mixture of the colors and light leakage.

The active matrix substrate 700 shown in FIGS. 2 and 3A does not require a black matrix in the display area, in which the picture element electrodes 10 for display are provided, since the gate signal lines 25 and the source signal lines 24 are present in the gaps between the picture element electrodes 10. Accordingly, only a so-called frame area surrounding the display area needs to be shielded against light in the following manner, which eliminates the step of forming a black matrix.

The frame area includes the gate signal lines 25 and the source signal lines 24. The gaps between each two adjacent gate signal lines 25 are covered by a layer provided on the same level as the source signal lines 24 so as to insulate the two adjacent gate signal lines 25 from each other, and the gaps between each two adjacent source signal lines 24 are covered by a layer provided on the same level as the gate signal lines 25 so as to insulate two adjacent source signal lines 24 from each other. Such layers, which are generally formed of at least a metal material since the gate and source signal lines 25 and 24, respectively, are formed of at least a metal material, are lustrous when seen from the front surface of the active matrix liquid crystal display device. In order to cover the lustrous layers, the color filter layer is extended to the frame area.

In the case where the color filter layer is included in the active matrix substrate, it is not necessary to consider the alignment error occurring when the active matrix substrate and the counter substrate are combined. Thus, the numerical aperture is further increased.

The structure, in which the color filter layer provided either in the counter substrate or the active matrix substrate is extended to the frame area, has a problem in that a portion of the sealing material exudes outside the panel when the sealing material is heated to be cured. More specifically, immediately before the sealing material is completely cured, a solvent and a filler for adjusting the viscosity of the sealing exudes outside the seal area due to the non-uniformity in thermal distribution and non-uniform mixture.

Such a phenomenon is closely related to the distance between the two substrates in the seal area. The distance between the two substrates is controlled to be a desired distance using both spacers contained in the sealing material and spacers scattered on the active matrix substrate. Both heat and pressure are simultaneously applied to the seal area. When the distance between the two substrates in the seal area is excessively small, a high pressure is concentrated on the sealing material in addition to heat. This is a cause of the exudation.

Specifically when the inner surfaces of the two substrates are flat, there is no space for the pressure applied on the sealing material to be released. Accordingly, the above-described phenomenon occurs more easily in such situations, and in the worst case, portions of the sealing material reach the display area. Further, portions of the sealing material (even portions not reaching the display area) remain uncured after the completion of the liquid crystal display device because the exuded components are not in a satisfactory state in which the main curing components are mixed uniformly. Such components may disadvantageously exude into the display area during the use of the liquid crystal display device. Such a phenomenon may result in a defective display or other problems which reduce overall reliability.

One way in which to reduce the problems discussed above with respect to exuding sealing material is to provide a non-planar face (as opposed to a flat face) on which the sealing material is applied. For example, a specific color layer can be formed thinner than the other color layers in the entire area in which the color layers are formed. In an alternative example, all the color layers are formed to have an equal thickness in the display area in order to prevent the chromaticity characteristics from being spoiled, and a specific color layer is formed to be thinner in another area, for example, only the seal area.

Such a method for producing a color filter layer has the following problems.

A dry film is applied on the base plate with a pressure so as to cover another dry film which is already applied. The another dry film, which is a color layer, generally has a thickness of 1 $\mu$m to 2 $\mu$m. Accordingly, it may be difficult to apply the dry film without forming a space between the dry film which is being applied and the base plate when the dry film is not sufficiently viscous. Air bubbles caused by the space may result in defective patterning along the border between the two color layers, and the air bubbles may cause the dry film to be delaminated in a later stage of production, resulting in contamination of the process.

For example, formation of a black color layer acting as a black matrix will be described with reference to FIGS. 13A, 13B and 13C.

In the structure in which the picture element electrodes overlap the gate signal lines and the source signal lines, a light-blocking layer is not required as described above. However, it is preferable to provide a light-blocking device at least on TFTs in order to prevent an increase of an off-state current in the TFTs caused by the semiconductor layer being irradiated with light incident on the panel.

FIG. 13A is a partial plan view of a color filter layer including a red color portion 1, a green color portion 2 and a blue color portion 3. Each portion has a recess 701 in positional correspondence with a TFT. When a dry film is applied so as to cover the portions 1, 2 and 3 for forming a black color layer in the direction of arrow X10, spaces are formed in the recesses 701 between the base plate and the dry film for the black color layer. Air bubbles are generated in such spaces and thus cause the dry film for the black color layer to be delaminated.

The red, green and blue color portions 1, 2 and 3 are provided in positional correspondence with picture element electrodes in accordance with the shapes of the electrodes. The color portions 1, 2 and 3 can be provided with a recess 702 as shown in FIG. 13B in accordance with the shape and arrangement of the picture element electrodes. When a dry film for forming a black color layer is applied so as to cover the color portions 1, 2 and 3 in the direction of arrow X11, a space is formed in the recess 702 between the base plate and the dry film for the black color layer. Air bubbles are generated in such a space and thus cause the dry film for the black color layer to be delaminated.

FIG. 13C shows a delta arrangement of color portions 1, 2 and 3 generally used in, for example, a monitor for an audiovisual apparatus. Formation of the red color portions 1 and the green color portions 2 leave the areas for blue color portions as gaps 703. When a dry film for forming blue color portions is applied so as to cover the red and green color portions 1 and 2, spaces are formed in the gaps 703 between the base plate and the dry film for the blue color portions. Air bubbles are generated in such spaces and thus cause the dry film for the blue color portions to be delaminated.

SUMMARY OF THE INVENTION

According to one aspect of the invention, a method for producing a color filter substrate is provided. The color filter substrate includes a base plate having a first side and a second side opposed to the first side, and a color filter layer provided on the base plate and including at least a first color layer having a plurality of first color portions and a second color layer having a plurality of second color portions. The at least the first color layer and the second color layer including a final color layer. The plurality of first color portions and the plurality of second color portions being respectively adjacent to each other. The method includes the step of forming a color filter layer, which includes a repetition of the steps of applying a dry film on the base plate from the first side to the second side of the base plate while pressing the dry film by a laminate method; and patterning the dry film applied on the base plate, thereby forming a color layer including a plurality of color portions. The final color layer is formed on at least a part of exposed surface areas extending from the first side to the second side. The dry film for forming the final color layer is applied while expelling air from between the dry film and the base plate through the exposed surface areas.

In one embodiment of the invention, the step of forming the color filter layer includes the step of forming a plurality of sub color filter sections each including one of the plurality of first color portions and one of the plurality of second color portions which are adjacent to each other. The sub color filter sections are formed to keep an exposed surface area along the first side. The final color layer is formed in exposed surface areas between the sub color filter sections and an exposed surface area along the first side. The dry film is applied while expelling air from between the dry film and the base plate through the exposed surface areas between the sub color filter sections and the exposed surface area along the first side.

In one embodiment of the invention, the step of forming the plurality of sub color filter sections includes the step of projecting an end of at least one of the plurality of sub color filter sections.

In one embodiment of the invention, the step of forming the plurality of sub color filter sections includes the step of forming a red color layer, a green color layer and a blue color layer; and the final color layer is formed as a light-blocking layer.

In one embodiment of the invention, the step of forming the color filter layer includes the step of forming red color portions, green color portions and blue color portions; and the final color layer is formed as a light-blocking layer between each adjacent portion of the red color portions, the green color portions and the blue color portions.

In one embodiment of the invention, at least one of the red color portions, the green color portions and the blue color portions is formed to have a side which forms an acute angle with respect to a dry film application direction.

According to another aspect of the invention, a method for producing a color filter substrate is provided. The color filter substrate includes a base plate having a first side and a second side opposed to the first side and including a display area and a frame area surrounding the display area, and a color filter layer provided on the base plate and including at least a first color layer having a plurality of first color portions and a second color layer having a plurality of second color portions. The at least the first color layer and the second color layer including a final color layer. The plurality of first color portions and the plurality of second color portions being respectively adjacent to each other in the display area. The method includes the step of forming a color filter layer, which includes a repetition of the steps of applying a dry film on the base plate from the first side to the second side of the base plate while pressing the dry film by a laminate method, and patterning the dry film applied on the base plate, thereby forming a color layer including a plurality of color portions. The final color layer is formed on at least a part of exposed surface areas extending from the first side to the second side and arranged in a branched manner in the frame area. The dry film for forming the final color layer is applied while expelling air from between the dry film and the base plate through the exposed surface areas.

In one embodiment of the invention, the frame area includes a seal area and a border area located between the seal area and the display area. The step of forming the color filter layer includes the step of forming the first color portions in the display area and the first color portions in the frame area so that at least one of opposing ends thereof forms an acute angle with respect to a dry film application direction in the border area.

In one embodiment of the invention, the step of forming the color filter layer includes the step of forming the first color portions and the second color portions such that the first color portions and the second color portions occupy substantially equal areas in the seal area.

In one embodiment of the invention, the step of forming the color filter layer includes the step of forming the first color portions and the second color portions such that the first color portions and the second color portions occupy substantially equal areas in the border area.

In one embodiment of the invention, the step of forming the color filter layer includes the step of forming the second color portions so as to have a smaller thickness than that of the first color portions in the seal area.

According to another aspect of the invention, a color filter substrate includes a base plate including a display area and a frame area surrounding the display area; and a color filter layer provided on the base plate and including at least a first color layer having a plurality of first color portions and a second color layer having a plurality of second color portions. The plurality of first color portions and the plurality of second color portions are respectively adjacent to each other in the display area. The plurality of second color portions are provided between the plurality of first color portions and arranged in a branched manner in the frame area.

In one embodiment of the invention, the frame area includes a seal area and a border area located between the seal area and the display area, and at least one of opposing ends of the first color portions in the display area and the first color portions in the frame area forms an acute angle with respect to a dry film application direction in the border area.

In one embodiment of the invention, the first color portions and the second color portions occupy substantially equal areas in the seal area.

In one embodiment of the invention, the first color portions and the second color portions occupy substantially equal areas in the seal area.

In one embodiment of the invention, the second color portions have a smaller thickness than that of the first color portions in the seal area.

According to the method for producing a color filter substrate of the present invention, the final color layer is formed on at least a part of exposed surface areas extending from the first side to the second side, and the dry film for forming the final color layer is applied while expelling air from between the dry film and the base plate through the exposed surface areas. Therefore, generation of air bubbles caused by air confined between the final dry film and the base plate is prevented, and thus delamination of the dry film is avoided.

In the case where a plurality of sub color filter sections each including one of a plurality of first color portions and one of a plurality of second color portions are formed to keep a surface area exposed along the first side and also have a surface area exposed between the color portions, the dry film for forming the final color layer is applied while expelling air from between the dry film and the base plate through the exposed surface areas. Therefore, generation of air bubbles caused by air confined between the final dry film and the base plate is substantially reduced, and thus delamination of the dry film is avoided.

In the case where an end of at least one of the plurality of sub color filter sections is formed to be projecting, the end is not parallel to the first side of the base plate. This allows the air to be expelled downstream from between the final dry film and the base plate with more certainty.

In the case where the plurality of sub color filter sections are formed to include a red color layer, a green color layer and a blue color layer, a full color display is realized. In the case where the final color layer is formed as a light-blocking layer, the switching devices such as TFTs are shielded against light. Thus, a liquid crystal display device including a color filter according to the present invention is highly reliable.

The plurality of sub color filter sections can be formed to include a red color layer, a green color layer and a blue color layer, and the final color layer is formed as a light-blocking layer between the red color portions, the green color portions, and the blue color portions. In such a case, the dry film for forming the final color layer is applied while expelling air from between the dry film and the base plate through the exposed D surface areas between the red, green, and blue color portions. Therefore, generation of air bubbles caused by air confined between the final dry film and the base plate is prevented, and thus delamination of the dry film is avoided.

In the case where at least one of the red color portions, the green color portions and the blue color portions is formed to have a side which forms an acute angle with respect to a dry film application direction, the dry film for forming the final color layer is applied while expelling air from between the dry film and the base plate, along the side forming the acute angle, through the exposed surface areas. Therefore, generation of air bubbles caused by air confined between the final dry film and the base plate is prevented, and thus delamination of the dry film is avoided.

According to the present invention, the final color layer is formed on at least a part of exposed surface areas extending from the first side to the second side and arranged in a branched manner in the frame area, and the dry film for forming the final color layer is applied while expelling air from between the dry film and the base plate through the exposed surface areas. Therefore, generation of air bubbles caused by air confined between the final dry film and the base plate is prevented, and thus delamination of the dry film is avoided.

The frame area can include a seal area and a border area located between the seal area and the display area, and the color filter layer can be formed to include the first color portions in the display area and the first color portions in the frame area so that at least one of opposing ends thereof forms an acute angle with respect to a dry film application direction in the border area. In such a case, when the dry film for forming the final color layer is applied, air between the dry film and the base plate is smoothly expelled and is not left in the border area and the vicinity thereof.

In the case where the color filter layer is formed so that the first color portions and the second color portions occupy substantially equal areas in the seal area and/or the border area, the seal area and/or border area is difficult to be visually recognized.

In the case where the color filter layer is formed so that the first color portions and the second color portions occupy substantially equal areas in the border area, chromatic non-uniformity is not generated even when the border area is visually recognized.

In the case where the color filter layer is formed so that the second color portions have a smaller thickness than that of the first color portions in the seal area, the distance between the active matrix substrate and the counter substrate is larger in the areas corresponding to the second color portions than in the other areas. Thus, the pressure applied to the sealing material is alleviated and the sealing material is prevented from exuding.

According to the color filter substrate of the present invention, a color filter layer includes at least a first color layer having a plurality of first color portions and a second color layer having a plurality of second color portions, and the plurality of second color portions are provided between the plurality of first color portions and arranged in a branched manner in a frame area. Therefore, generation of air bubbles caused by air confined between the final dry film and the base plate is substantially reduced, and thus delamination of the dry film is avoided. The resulting color filter is highly reliable.

The frame area can include a seal area and a border area located between the seal area and the display area, and at least one of opposing ends of the first color portions in the display area and the first color portions in the frame area can form an acute angle with respect to a dry film application direction in the border area. In such a case, generation of air bubbles is prevented with more certainty. The resulting color filter is more reliable.

In the case where the first color portions and the second color portions occupy substantially equal areas in the seal area and/or border area, the seal area and/or border area is difficult to be visually recognized.

In the case where the second color portions have a smaller thickness than that of the first color portions in the seal area, the sealing material is prevented from exuding.

Thus, the invention described herein makes possible the advantage of providing a color filter substrate and method for producing the same, for preventing generation of air bubbles during the application of dry films.

This and other advantages of the present invention will become apparent to those skilled in the art upon reading and understanding the following detailed description with reference to the accompanying figures.

BRIEF DESCRIPTION OF THE DRAWINGS

FIG. 3A is a cross-sectional view of the active matrix substrate shown in FIG. 2 taken along line A–A' in FIG. 2;

FIG. 3B is a cross-sectional view of an active matrix substrate including a color filter layer according to a second example of the present invention, the active matrix substrate having the same planar structure with that of the active matrix substrate shown in FIG. 2;

FIG. 5A is a partial plan view of a color filter layer according to a third example of the present invention;

FIG. 5B is a partial plan view of an alternative color filter layer according to the third example;

FIG. 6 is a partial plan view of a color filter substrate according to a fourth example of the present invention;

DESCRIPTION OF THE PREFERRED EMBODIMENTS

Figure 1A:
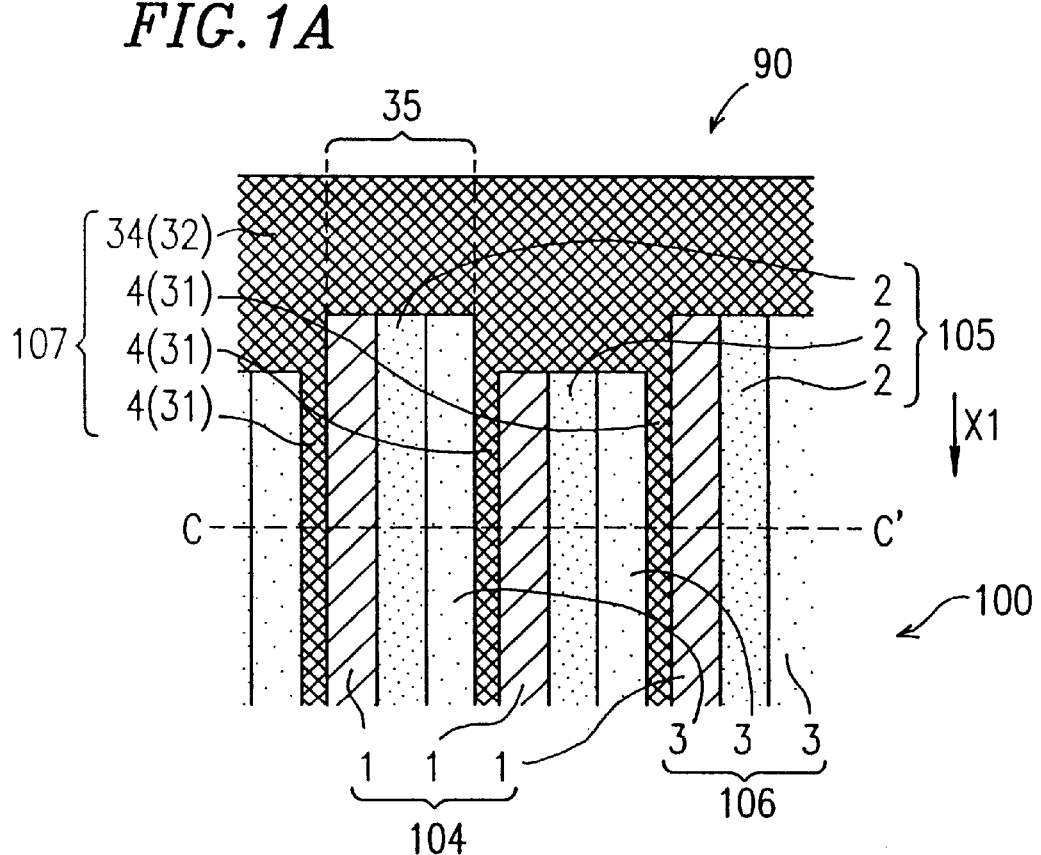
FIG. 1A is a partial plan view of a color filter substrate according to a first example of the present invention.

Hereinafter, the present invention will be described by way of illustrative examples with reference to drawings. In the following examples, identical elements bear identical reference numerals and description thereof will not be repeated.

EXAMPLE 1

Figure 1B:
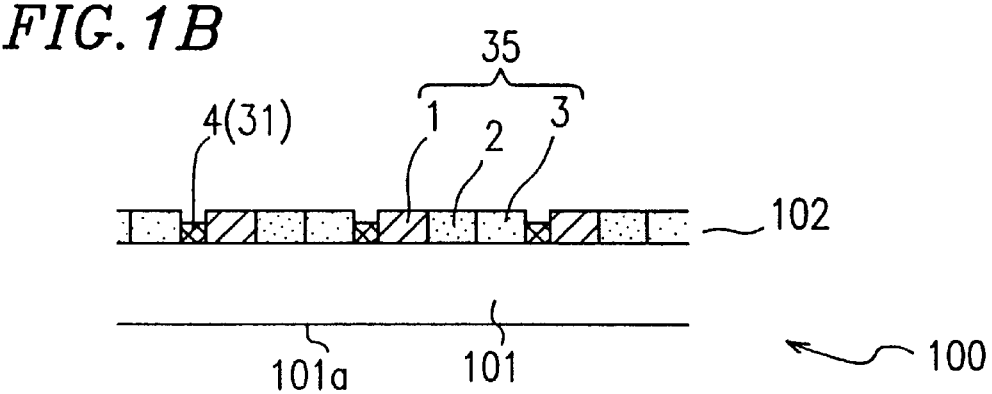
FIG. 1B is a cross-sectional view of the color filter substrate in FIG. 1A taken along line C–C' of FIG. 1A.

A color filter substrate 100 according to a first example of the present invention will be described with reference to FIGS. 1A and 1B. FIG. 1A is a partial plan view of the color filter substrate 100, and FIG. 1B is a cross-sectional view of the color filter substrate 100 taken along line C–C' of FIG. 1A.

The color filter substrate 100 is usable as a counter substrate of a liquid crystal display device (not shown). The color filter 100 includes a rectangular transparent insulative base plate 101 (FIG. 1B; referred to simply as the "base plate 101") and a color filter layer 102 provided on the base plate 101. The color filter layer 102 includes a plurality of sub color filter sections 35 and a black color layer 107 (FIG. 1A) acting as a black matrix.

As used herein, the term "color portions" is defined as a minimum unit included in the color filter layer 102, and is, for example, a stripe red color portion 1 (best shown in FIG. 1A). The term "sub color filter section" is defined as a collection of a plurality of adjacent color portions, and includes, for example, a red color portion 1, a green color portion 2 and a blue color portion 3. The sub color filter section excludes the black color layer. The term "color layer" is defined as a collection of a plurality of color portions of the same color, and is, for example, a red color layer 104 including a plurality of red color portions 1, a green color layer 105 including a plurality of green color portions 2, a blue color layer 106 including a plurality of blue color portions 3, or the black color layer 107 including a plurality of black portions 4 and a peripheral black portion 34. The term "final color layer" is defined as the last applied color layer. The term "color filter layer" is defined as a layer including all the color layers including the black color layer. The term "dry film application direction" is defined as a direction parallel to the longitudinal direction of the color portions which are already formed.

In this example, the sub color filter section 35 each include a plurality of color portions (for example, a red color portion 1, a green color portion 2 and a blue color portion 3). Although the positional relationship between the color filter substrate 100 and an active matrix substrate (not shown) when the two substrates are combined in order to produce a liquid crystal display device is not shown here, the red color portion 1, the green color portion 2 and the blue color portion 3 of each sub color filter section 35 are arranged so as to oppose picture element electrodes (not shown) provided on the active matrix substrate when so combined. As used herein, a "picture element electrode" is defined as a part of one pixel used for display of each color red, green and blue. One pixel includes three primary color picture elements. As used herein, the term "exposed surface area" is defined as an area of the surface of the base plate on which no color portion is provided until the final color layer is formed. The exposed surface area can be, for example, a gap 31 between the color portions or a peripheral area 32 along a side 90 of the base plate. Alternatively, the exposed surface area can be a surface of a layer provided on the base plate.

The black color layer 107 includes a plurality of black color portions 4 and the peripheral black portion 34. The black color layer 107 is provided on the exposed surface areas. The black color portions 4 are provided on gaps 31 between the plurality of sub color filter sections 35, and the peripheral black color portion 34 is provided on a peripheral area 32 (exposed surface area) along one side 90 of the base plate 101. The side 90 will be referred to as a "first side 90" for convenience. The gaps 31 and the peripheral area 32 are adjacent to each other.

Figure 1C:
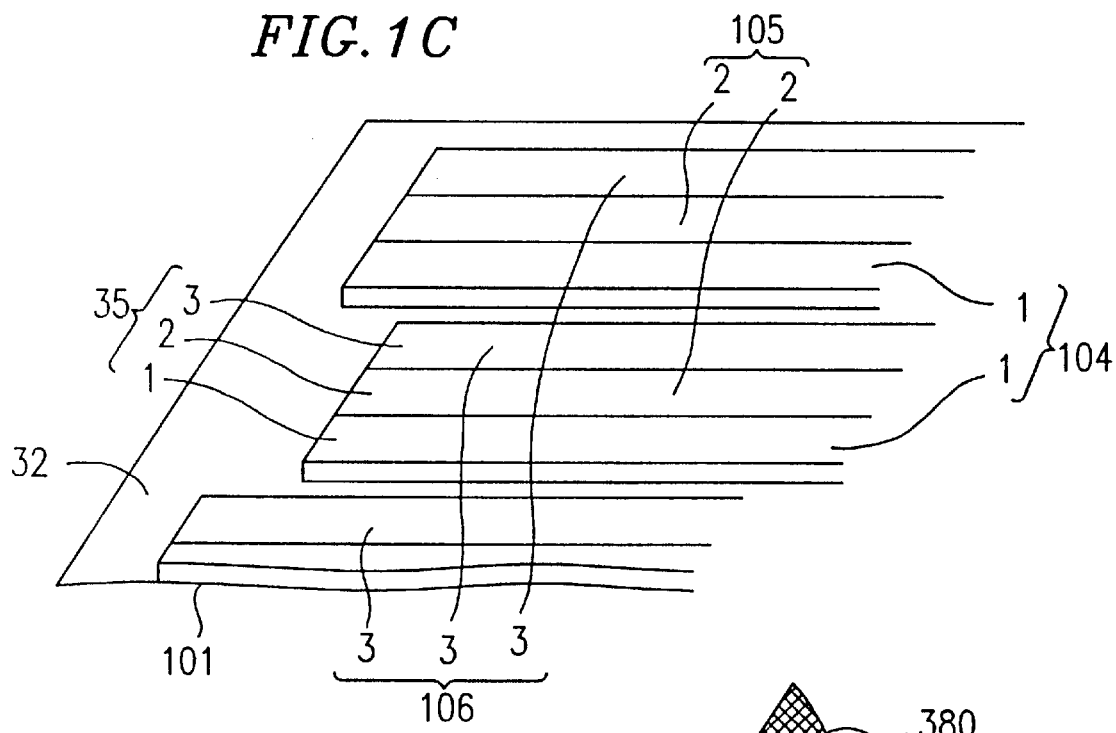
FIGS. 1C and 1D are isometric views illustrating a method for producing the color filter substrate shown in FIG. 1A.
Figure 1D:
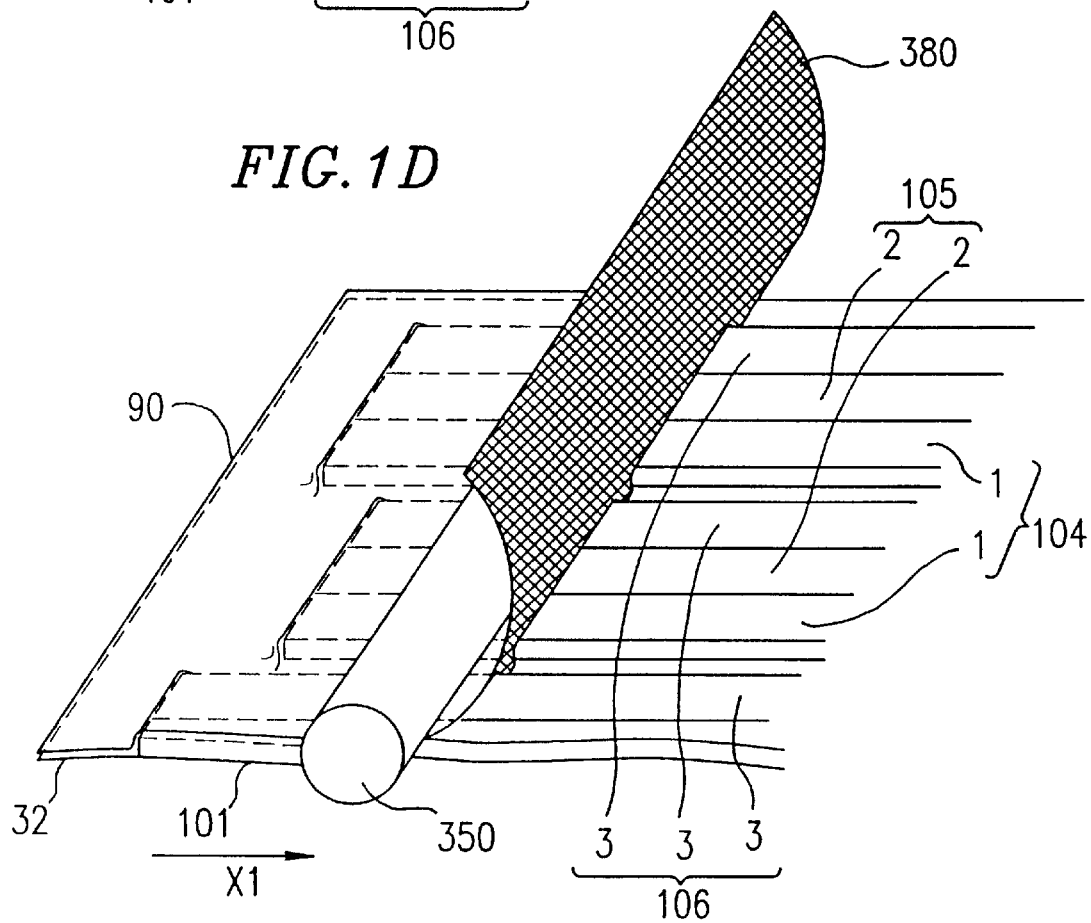

With reference to FIGS. 1C and 1D, a method for producing the color filter substrate 100 will be described. In the present invention, any type of dry film is usable.

First, a negative photosensitive resin film (also referred to as a "dry film") containing a red pigment dispersed therein and having a thickness of, for example, about 1.7 µm is pressed by a roller 350 (FIG. 1D) to adhere to the base plate 101 by a laminate method.

Next, only areas of the photosensitive resin film which will correspond to the picture element electrodes for red display when the color filter substrate 100 is combined with the active matrix substrate are exposed to light, following which the photosensitive resin film is treated by an alkaline solution. Since the photosensitive resin film is negative as described above, areas which are not exposed to light are dissolved, thereby forming a plurality of red color portions 1, i.e., the red color layer 104 having a thickness of, for example, 1.7 µm is on the base plate 101. The red color layer 104 is baked to be integrally secured to the base plate 101. Since the thickness of a layer formed by the laminate method does not change substantially after baking, the thickness of the red color layer 104 can be controlled easily by using a dry film having a preferable thickness. In this specification, layers or films are exposed to ultraviolet rays.

The same procedure is performed using a photosensitive resin film containing a green pigment dispersed therein, thereby forming and integrally securing a plurality of green color portion 2, i.e., the green color layer 105 having a thickness of, for example, 1.7 µm on the base plate 101. The same procedure is performed using a photosensitive resin film containing a blue pigment dispersed therein, thereby forming and integrally securing a plurality of blue color portion 3, i.e., the blue color layer 106 on the base plate 101. Thus, as shown in FIG. 1C, the plurality of sub color filter sections 35 are formed.

Figure 13A:
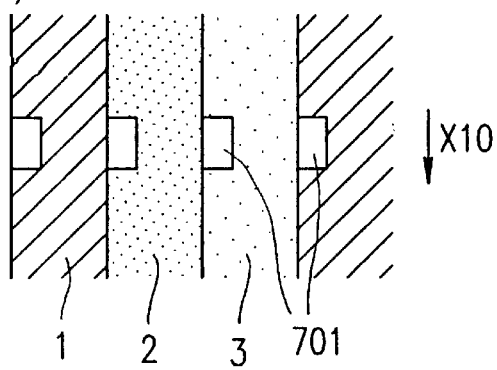
FIGS. 13A, 13B and 13C are partial plan views of conventional color filter substrates.
Figure 13B:
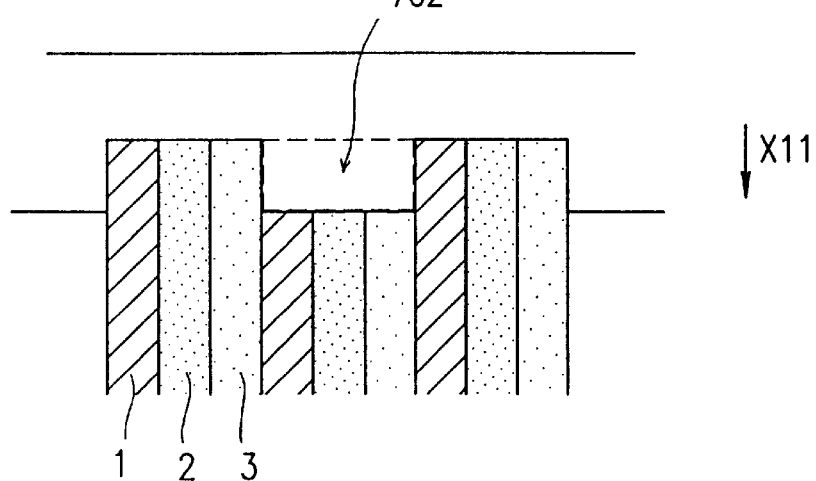
Figure 13C:
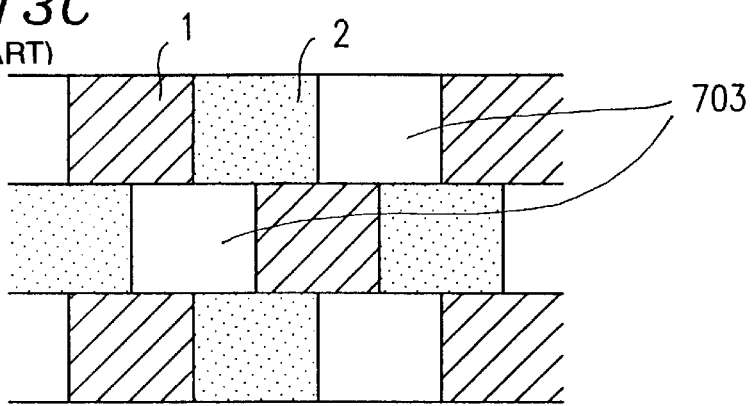

The red, green and blue color portions 1, 2 and 3 are arranged so as to keep the peripheral area 32 (FIG. 1A) away from the first side 90 and also so as to have gaps 31 therebetween in order to avoid the space 702 as shown in FIG. 13B regarding the conventional color filter substrate. Although not shown, the sub color filter sections 35 are arranged so as to keep an opposing peripheral area away from a second side opposed to the first side 90. The gaps 31 (FIG. 1A) extend from the peripheral area 32 along the first side 90 to the opposing peripheral area along the second side of the base plate 101. The gaps 31 each have a width of, for example, about 2 µm.

After the sub color filter sections 35 are formed as shown in FIG. 1C, a photosensitive resin film 380 containing a black pigment dispersed therein and having a thickness of, for example, about 1.5 μm is pressed by the roller 350 to adhere to the base plate 101 by a laminate method so as to cover the sub color filter sections 35 as shown in FIG. 1D. The photosensitive film 380 is applied in the direction of arrow X1 from the first side 90 toward the second side. The gaps 31 (FIG. 1A) reduce the possibility of air from being confined between the dry film and the base plate 101 and thus reduce or completely eliminate the generation of air bubbles. The dry film 380 is patterned by exposure and treatment by an alkaline solution, thereby forming the black color layer 107 on the gaps 31 and the peripheral area 32.

Next, the color layers 104, 105, 106 and 107 are exposed to light directed toward a rear surface 101a (FIG. 1B) of the base plate 101, thereby performing photopolymerization. After that, development is performed. As a result, the color filter substrate 100 is produced.

In this example, as described above, the dry film used for the black color layer 107 (which is in this case, final color layer; see FIG. 1A) is applied to the base plate 101 while expelling air between the dry film and the base plate 101 through gaps 31. Accordingly, air bubbles are not generated, thereby substantially preventing delamination of the dry film.

Furthermore, since the thickness of the black color layer 107 (about 1.5 μm) is less than the thickness of the sub color filter sections 35 (about 1.7 μm), there is substantially less possibility of the sealing material used for bonding the color filter substrate 100 to the active matrix substrate from exuding.

In this example, the red color portions 1, the green color portions 2 and the blue color portions 3 are arranged so that the gaps 31 are located between the red color portions 1 and the blue color portions 3. Alternatively, the color portions 1, 2 and 3 can be arranged so that the gaps 31 are located between the red color portions 1 and the green color portions 2, between the green color portions 2 and the blue color portions 3, or even between the red and green color portions 1 and 2, the green and blue color portions 2 and 3 and the blue and red color portions 3 and 1.

EXAMPLE 2

A color filter according to a second example of the present invention will be described with reference to FIGS. 2, 3B, 4A and 4B. In this example, a color filter layer is provided as an interlayer insulative layer 8 included in an active matrix substrate 200. Since the plan view of the active matrix substrate 200 is identical with the view shown in FIG. 2 discussed above, FIG. 2 shall also serve as a plan view of the active matrix substrate 200 in the second example. FIG. 3B is a cross-sectional view of the active matrix substrate 200 taken along line A–A' of FIG. 2.

Figure 2:
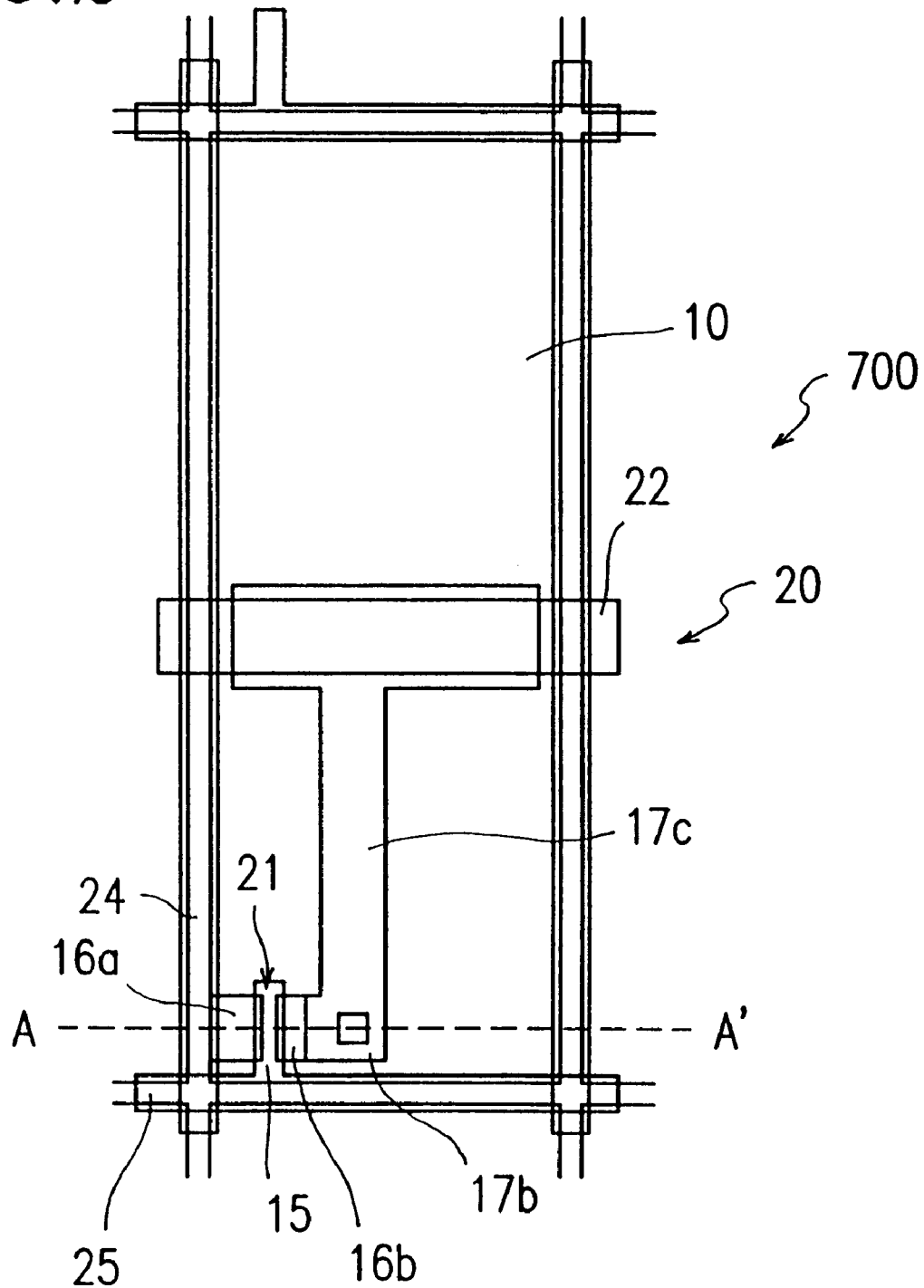
FIG. 2 is a partial plan view of an active matrix substrate of a liquid crystal display device.

As shown in FIG. 2, the active matrix substrate includes a plurality of gate signal lines 25 acting as scanning lines and a plurality of source signal lines 24 acting as signal lines perpendicular to the gate signal lines 25. A plurality of picture element electrodes 10 (only one is shown in FIG. 2) formed of a transparent conductive material are provided in a matrix in the state of being surrounded by the gate signal lines 25 and the source signal lines 24. A plurality of TFTs 21 (only one is shown in FIG. 2) are provided at intersections of the gate signal lines 25 and the source signal lines 24.

With reference to FIG. 3B, the cross-sectional structure of the active matrix substrate 200 will be described. For simplicity, the description will be directed to picture element area. The active matrix substrate 200 includes a transparent insulative base plate 5 (referred to simply as the "base plate"), a gate electrode 12 provided on the base plate 5, a gate insulative layer 13 provided on the base plate 5 so as to cover the gate electrode 12, a semiconductor layer 14 provided on the gate insulative layer 13 above the gate electrode 12, and a channel protection layer 15 provided on a central part of the semiconductor layer 14. The active matrix substrate 200 further includes a source electrode 16a and a drain electrode 16b provided on the gate insulative layer 13 so as to cover the semiconductor layer 14 and the channel protection layer 15. The source electrode 16a and the drain electrode 16b are formed of $n^+$-Si and are separated from each other on the channel protection layer 15.

The source electrode 16a is connected to the source signal line 24 including a transparent conductive layer 17a and a metal layer 18a provided on the transparent conductive layer 17a. The drain electrode 16b is connected to a two-film layer including a transparent conductive layer 17b and a metal layer 18b. As shown in FIG. 2, the gate electrode 12 is branched from the gate signal line 25. The gate electrode 12, the source electrode 16a, the drain electrode 16b, the semiconductor layer 14, the channel protection layer 15, and an area of the gate insulative layer 13 below the semiconductor layer 14 are included in the TFT 21. The TFT 21 is driven by a signal inputted to the gate electrode 12 from the gate signal line 25. Referring briefly to FIG. 2, a video signal for display is inputted to the source electrode 16a from the source signal line 24. The above-described part of the active matrix substrate 200 corresponds to the base plate 101 in the first example on which the color layers are provided. The assembly of the above-described part of the active matrix substrate 200 and the interlayer insulative layer 8 corresponds to the color filter substrate 100 in the first example.

Returning to FIG. 3B, the active matrix substrate 200 further includes the interlayer insulative layer 8 provided on the gate insulative layer 13 so as to cover the TFT 21, the transparent conductive layers 17a and 17b, and the metal layers 18a and 18b. The interlayer insulative layer 8 has a contact hole 11 formed therethrough. The picture element electrode 10 is provided on the interlayer insulative layer 8. The transparent conductive layer 17b is extended to below the contact hole 11. An extended part of the transparent conductive layer 17b acts as a connection electrode 17c (FIG. 2). The picture element electrode 10 is electrically connected to the drain electrode 16b through the transparent conductive layer 17b.

Referring to FIG. 2 again, a portion of the connection electrode 17c is extended to a central part of the picture element electrode 10 substantially in parallel to the source signal line 24, and another portion of the connection electrode 17c is extended substantially in parallel to the gate signal line 25 in the central part. In the central part, the connection electrode 17c substantially overlaps a storage capacitance line 22 provided in parallel to the gate signal line 25. The overlapping connection electrode 17c and storage capacitance line 22 act as electrodes forming a storage capacitance.

As shown in FIG. 3B, the interlayer insulative layer 8 includes a color portion in correspondence with the picture element electrode. In the picture element area shown in FIG. 3B, the interlayer insulative layer 8 includes a red color portion 1 (a green color portion 2 and a blue color portion 3 are also partially shown). The interlayer insulative layer 8 also includes a black color portion 4 on the TFT 21 and the vicinity thereof.

Figure 4A:
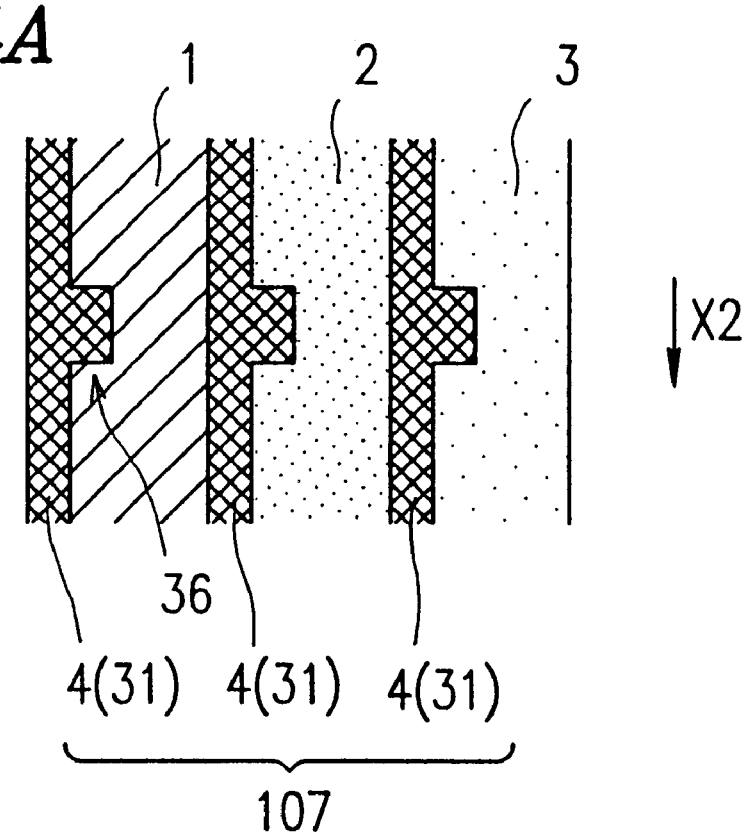
FIG. 4A is a partial plan view of a color filter layer according to the second example.

As shown in FIG. 4A and as described later, the red, green and blue color portions 1, 2 and 3, which are formed prior to the black color portion 4, are arranged with gaps 31 therebetween in order to avoid generation of air bubbles during the formation of the black color portion 4. The red, green and blue color portions 1, 2 and 3 also each have a recess 36 along the TFT 21. The black color portions 4 is provided on the gaps 31 and the recesses 36.

Hereinafter, a method for producing the active matrix substrate 200 will be described. Again for simplicity, the description will be directed to one picture element area unless otherwise mentioned.

As shown in FIGS. 2 and 3B, the gate signal lines 25, the gate electrode 12, the storage capacitance line 22, the gate insulative layer 13, the semiconductor layer 14, the channel protection layer 15, the source electrode 16a of $n^+$-Si and the drain electrode 16b of $n^+$-Si are formed on the base plate 5 in a conventional manner.

Then, ITO and a metal material are sequentially deposited thereon by sputtering and patterned, thereby forming the source electrode 24 including the transparent conductive layer 17a (ITO) and the metal layer 18a, the transparent conductive layer 17b (ITO), the metal layer 18b, and the connection electrode 17c (FIG. 2).

Next, a negative photosensitive resin film (or a dry film) containing a red pigment dispersed therein and having a thickness of, for example, about 1.7 μm is formed on top of those elements described above which is included in the active matrix by a laminate method (i.e., reference numerals 5, 12, 13, 14, 15, 16a, 16b, 17a, 17b, 18a and 18b). An area of the photosensitive resin film corresponding to the picture element electrode for red, except for the contact hole 11, is exposed to light, and the photosensitive resin film is treated by an alkaline solution. Since the photosensitive resin film is negative as described above, areas which are not exposed to light are dissolved, thereby forming the red color portion 1 and the contact hole 11 through the photosensitive film. Following this step, the red color portion 1 is integrally secured. The red color portion 1 acts as a part of the interlayer insulative layer 8.

For another picture element area, the same procedure is performed using a photosensitive resin film containing a green pigment dispersed therein, thereby forming a green color portion 2 and a contact hole 11. The green color portion 2 acts as a part of the interlayer insulative layer 8. For yet another picture element area, the same procedure is performed using a photosensitive resin film containing a blue pigment dispersed therein, thereby forming a blue color portion 3 (see FIG. 4A) and a contact hole 11. The blue color portion 3 acts as a part of the interlayer insulative layer 8.

As shown in FIG. 4A, the red, green and blue color portions 1, 2 and 3 are formed with a gap 31 having a width substantially not exceeding the width of the source signal line 24 (FIG. 2). The red, green and blue color portions 1, 2 and 3 are formed to have a recess 36 along the TFT 21.

After the red, green and blue color portions 1, 2 and 3 are formed, a photosensitive resin film containing a black pigment dispersed therein and having a thickness of, for example, about 1.5 μm is applied in a laminate method in the direction of arrow X2 from one side to another side opposite the one side. Then, areas corresponding to the gaps 31 and the recesses 36 are exposed to light and the photosensitive resin film is treated by an alkaline solution. As a result, a plurality of black color portions 4, i.e., the black color layer 107 is formed so as to cover the TFTs 21 (FIG. 3B). The gaps 31 substantially prevent air from being confined between the dry film and the TFTs 21 and the vicinity thereof and thus avoids generation of air bubbles.

Next, as shown in FIG. 3B, a transparent conductive material is sputtered on the interlayer insulative layer 8 and patterned, thereby forming the picture element electrodes 10. Each picture element electrode 10 is patterned to overlap the source signal line 24 (FIG. 2) by a width of, for example, about 1 μm or more. Thus, each picture element electrode 10 is electrically connected to the drain electrode 16b through the transparent conductive layer 17b via the contact hole 11. When such a structure in which the picture element electrode 10 overlaps the gate signal line 25 and the source signal line 24 with the interlayer insulative layer 8 interposed therebetween is used f or a liquid crystal display device, the numerical aperture is increased, and also prevents defective alignment of liquid crystal molecules since the electric field caused by the signal lines is shielded.

The active matrix substrate 200 produced in the above-described manner and a counter substrate including a counter electrode formed of ITO or the like are combined together with a sealing material, and a liquid crystal layer is injected between the two substrates in a conventional manner. Thus, a liquid crystal panel is produced.

As best shown in FIG. 4A, in this example, the black color portions 4 are formed between each adjacent portion of the red, green and blue color portions 1, 2 and 3 (i.e., on the TFTs 21 and areas where any of the red, green and blue color portions 1, 2 and 3 is not provided). The black color portion 4 is not provided on the contact hole 1. By such an arrangement, the interlayer insulative layer B is prevented from having a rugged surface, and accordingly the defective display caused by disturbed alignment of the liquid crystal molecules is avoided. Moreover, the black color portion 4 provided on the metal layer 18a (FIG. 3B) effectively restricts the high reflectance of the metal layer 18a and enhances the display quality.

The black color portion 4 is provided on the TFT 21 (FIG. 3B) in order to prevent light incident on the surface of the liquid crystal panel from reaching the semiconductor layer 14. When such light reaches the semiconductor layer 14 through the liquid crystal layer and the transparent layers, the photo excitation increases the off-state current of the TFT 21 and thus causes the picture element electrode 10 to retain less electric charges.

Figure 4B:
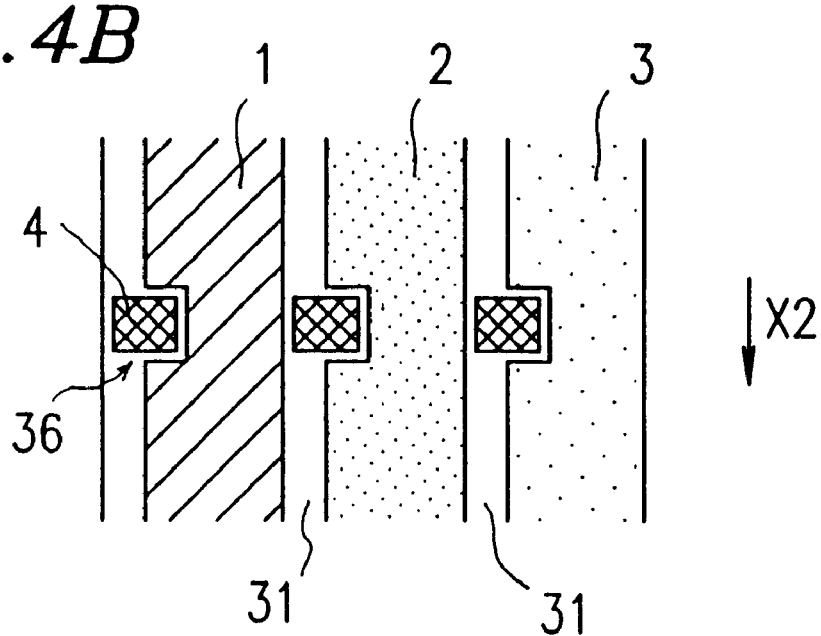
FIG. 4B is a partial plan view of an alternative color filter layer according to the second example.

The black color portions 4 can be provided on the TFTs 21 as shown in FIG. 4B. Alternatively, the formation of the black color portions 4 on the metal layers 18a and 18b can be eliminated.

In this example, the color layers including a plurality of color portions are formed by exposing and dissolving a photosensitive resin film. Alternatively, the color layers can be formed by applying a non-photosensitive resin film by a laminate method and performing resist application, exposure, development and etching.

In this example, the dry film used for the black color layer 107 (final color layer) is applied in the direction of X2 (FIG. 4A) while expelling air between the dry film and the TFTs 21 and the vicinity thereof through gaps 31. Accordingly, air bubbles are not generated, which substantially reduces the possibility of delamination of the dry film.

Furthermore, since the thickness of the black color layer 107 (about 1.5 μm) is less than the thickness of the other color layers (about 1.7 μm), the sealing material used for bonding the active matrix substrate 200 to the counter substrate is typically prevented from exuding.

EXAMPLE 3

A color filter layer 300 according to a third example of the present invention will be described with reference to FIGS.

5A and 5B. As in the second example, the color filter layer 300 is used as an interlayer insulative layer included in an active matrix substrate (not shown). The color filter layer 300 includes a red color portion 1, a green color portion 2 and a blue color portion 3, which are formed to have a gap 31 therebetween. The gap 31 does not substantially exceed the width of the source signal line 24 (FIG. 2). The red color portion 1, the green color portion 2 and the blue color portion 3 each has a recess 33 along the TFTs 21. As shown in FIG. 5A, the recess 33 has a side which is slanting downstream and forms an acute angle with respect to the direction of arrow X3 in which a dry film for the black color portions 4 is applied.

Due to such a shape of the recess 33, when the dry film is applied, air is expelled along the slanting perimeter toward the gap 31 and thus is more easily expelled. Accordingly, generation of air bubbles is prevented more strictly, which prevents delamination of the dry film more effectively.

EXAMPLE 4

A color filter substrate 400 according to a fourth example of the present invention will be described with reference to FIG. 6. As in the first example, the color filter substrate 400 acts as a counter substrate which is combined with an active matrix substrate in order to produce a liquid crystal display device.

The color filter substrate 400 includes a base plate (not shown) and a plurality of sub color filter sections 35 provided on the base plate. The plurality of sub color filter sections 35 each include a red color portion 1, a green color portion 2 and a blue color portion 3. The color filter 400 further includes a black color layer 107 including a plurality of black color portions 4 provided on gaps 31 between the sub color filter sections 35 and a peripheral black portion 34 provided on a peripheral area 32 along a first side 90 of a rectangular base plate on which the color filter 400 is provided.

At least one of the sub color filter sections 35 is formed to have a projecting part 45 which projects toward the first side 90, from which the dry film is applied in the direction of arrow X4 to form the black color layer 107. Due to the projecting part 45, a dry film of either color is not perpendicular to the color portion or portions already formed. This allows air to be expelled in the direction of arrow X4, thus avoiding generation of air bubbles.

Moreover, the dry film used for the black color layer 107 (final color layer) is applied in the direction of X4 while expelling air between the dry film and the base plate through the gaps 31. Accordingly, air bubbles are not typically generated, which prevents delamination of the dry film.

EXAMPLE 5

A color filter substrate 500 according to a fifth example of the present invention will be described with reference to FIG. 7. The color filter substrate 500 is used as a counter substrate, which can be combined with an active matrix substrate to produce a liquid crystal display device (not shown).

Figure 7:
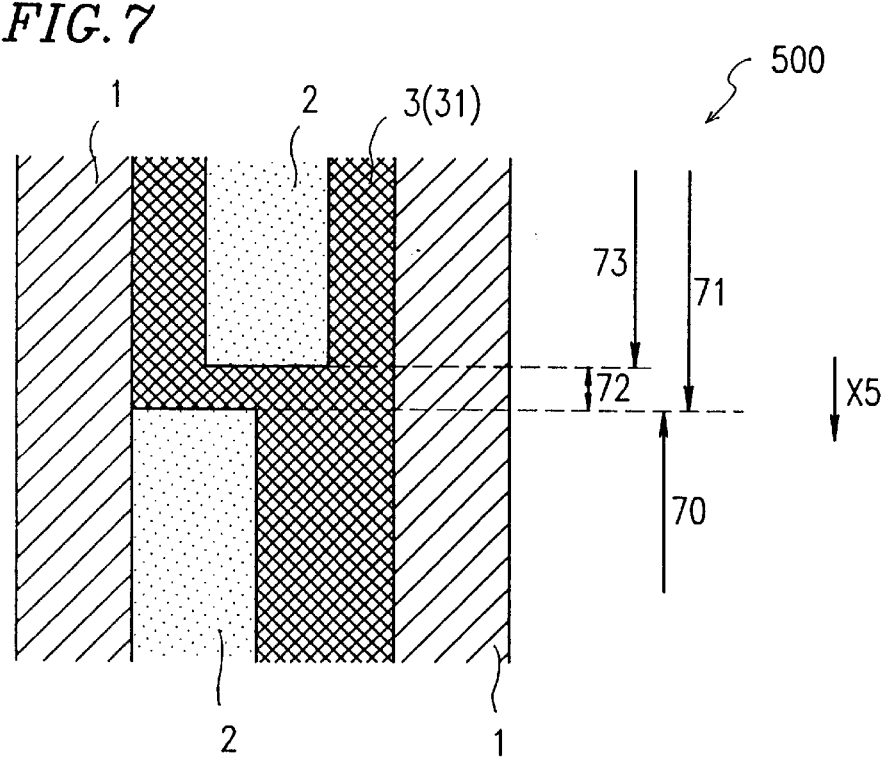
FIG. 7 is a partial plan view of a color filter substrate according to a fifth example of the present invention.

FIG. 7 is a partial plan view of the color filter substrate 500, illustrating a frame area 71 thereof. As used herein, the "frame area" is defined as an area of the base plate surrounding a display area (represented by reference numeral 70 in FIG. 7). At least when the color filter is incorporated into the finished product (i.e., a liquid crystal display device), the user can see the frame area. Referring to FIG. 7, the frame area 71 includes a seal area 73 on which a sealing material is to be applied for combining the color filter substrate 500 and the active matrix substrate, and a border area 72 around a display area 70 of the color filter substrate 500.

The color filter substrate 500 is to be combined with an active matrix substrate having a light-blocking function, although the active matrix substrate is not shown. Specifically, the active matrix substrate includes picture element electrodes overlapping source signal lines and gate signal lines with an interlayer insulative layer interposed therebetween. Since the source signal lines and the gate signal lines are provided below the picture element electrodes, a black matrix is not required in the color filter substrate 500 acting as a counter substrate. Gaps between each two adjacent gate electrode lines are covered by a layer provided on the same level as the source signal lines so as to insulate the two adjacent gate electrode lines from each other, and gaps between each two adjacent signal electrode lines are covered by a layer provided on the same level as the gate signal lines so as to insulate two adjacent signal electrode lines from each other. Such layers, which are generally formed of at least a metal material since the gate and source signal lines and are formed of at least a metal material, are lustrous when seen from the surface of the active matrix liquid crystal display device. In order to cover the lustrous layers, the color portions 1, 2 and 3 are extended to the frame area 71.

Continuing to refer to FIG. 7, a method for producing the color filter substrate 500 will be described.

A negative photosensitive resin film containing a red pigment dispersed thereon and having a thickness of, for example, about 1.7 $\mu$m is pressed to adhere to a base plate by a laminate method.

Areas of the photosensitive resin film corresponding to the picture element electrodes for red display and the frame area extended therefrom are exposed to light. In order to provide, in the frame area 71, a pattern of each color layer which is similar to that in the display area 70, the photosensitive resin film is also exposed in the same pattern as that in the display area 70. Then, the photosensitive resin film is treated by an alkaline solution. Since the photosensitive resin film is negative as described above, areas which are not exposed to light are dissolved, thereby forming a plurality of red color portions 1 (FIG. 7), i.e., the red color layer having a thickness of, for example, 1.7 $\mu$m is on the base plate. The red color layer is baked to be integrally secured to the base plate. Since the thickness of a layer formed by the laminate method does not change substantially after baking, the thickness of the red color layer can be controlled easily by using a dry film having a preferable thickness.

The same procedure is performed using a photosensitive resin film containing a green pigment dispersed therein, thereby forming and integrally securing a plurality of green color portion 2 having a thickness of, for example, about 1.7 $\mu$m (FIG. 7), i.e., the green color layer on the base plate. As shown in FIG. 7, the green portions 2 are not formed in the border area 72 and are provided discontinuously from the seal area 73 to the display area 70. The border area 72 has a length of, for example, about 50 $\mu$m in the direction of arrow X5 in which the dry films are applied. The green color portion 2 in the seal area 73 is arranged away from the red color portions 1 by a half of the width of the picture element electrode. Thus, gaps 31 are provided between the red color portions 1 and the green color portion 2 in the frame area 71 so as to be shaped in the form of a branch. In other words, the gaps 31 are provided in a branched manner.

Then, a photosensitive resin film containing a blue pigment dispersed therein and having a thickness of, for example, about 1.7 μm is pressed to adhere to the base plate so as to cover the red color portions 1 and the green color portions 2. Needless to say, the dry film for blue is also formed on the gaps 31 extending to one side of the base plate to another other side opposed to the one side.

When the dry film for blue is applied, the gaps 31 substantially prevent air from being confined between the dry film and the base plate and the vicinity thereof and thus avoids generation of air bubbles.

Then, the color portions 1, 2 and 3 are exposed to light directed toward a rear surface of the base plate, thereby performing photopolymerization. Following this step, development is performed. As a result of the exposure to light, the blue color portions 3 having a thickness of about 1.2 μm is obtained without spoiling the adhesion to the base plate or reliability. In the seal area 73, the blue color portions 3 which are thinner than the color portions of the other colors are located between the red color portions 1 and the green color portions 2.

The color filter layer obtained in this manner is irradiated with ultraviolet light which is strong but does not reduce the overall chromaticity, and then the color filter layer is baked, thereby improving the stability of the color layers.

A transparent counter electrode of ITO or the like is formed on the color filter layer, and an alignment layer is formed on an area corresponding to the display area 70 and then is provided with an alignment function by rubbing or ultraviolet radiation. Thus, the color filter substrate 500 acting as the counter substrate is produced.

Although not shown, on a display area of an active matrix substrate produced separately, an alignment layer formed of polyimide is formed and provided with an alignment function by rubbing or ultraviolet radiation.

A sealing material is applied along the perimeters of the substrates by a printing method or the like except for an injection opening for a liquid crystal material. A conductive material is applied on a signal input terminal for the counter electrode. The signal input terminal is provided on the active matrix substrate. Spacers for uniformizing the thickness of the liquid crystal layer are scattered on the active matrix substrate. The two substrates are positionally aligned with each other and attached together and heated to cure the sealing material. The liquid crystal material is injected to the injection opening, and the opening is sealed by a sealing agent. Thus, the liquid crystal display device is completed. The blue color portions 3 which are thinner than the red color portions 1 and the green color portions 2 in the seal area 73 increases the distance between the two substrates in the seal area 73 and thus alleviates the pressure applied on the sealing material. Thus, the sealing material is prevented from exuding when the two substrates are assembled together.

In this example, red, green and blue color portions are formed in this order. The order can be changed. Instead of red, green and blue, other colors, for example, cyan, magenta and yellow can be used. This is applicable to all the examples of the present invention.

In the case where color portions of one color are thinner than the portions of the other colors as in this example, the purity of the color of the thinner portions may be disadvantageously deteriorated. Such a disadvantage can be effectively overcome by adjusting the amount of the pigment of that color. In some cases, the adjustment of the pigment is difficult due to, for example, the restriction of the exposure sensitivity for pattern formation. In some other cases, the adjustment of the amount of the pigment is not preferable for display quality because the distance between the two substrates in the display area is not uniform. In such cases, the color portions in the seal area 73 can be formed thinner than the color portions of the same color in the display area 70 by, for example, adjusting exposure time.

In this example, the green color portions 2 are offset from the red color portions 1 by a half of the width of the picture element electrode in the seal area 73 in order to apply a maximum possible uniform pressure on the sealing material when the color filter substrate 500 is combined with the active matrix substrate. In the case where the area of the thinner portions is required to be increased in the seal area 73, the width of the red color portions 1 and the green color portions 2 can be reduced as long as the external appearance is not spoiled.

Figure 8:
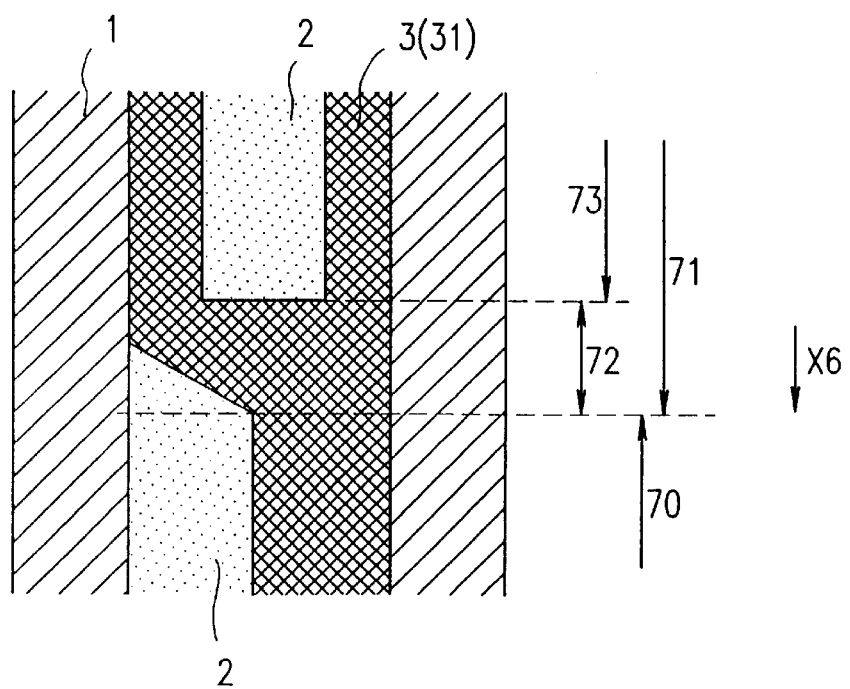
FIG. 8 is a partial plan view of an alternative color filter substrate according to the fifth example of the present invention.

Alternatively, the green color portions 2 can be provided as shown in FIG. 8. In FIG. 8, the green color portion 2 in the display area 70 extends into the border area 72, and an end of the green color portion 2 has an acute angle with respect to a longitudinal direction of the color portions 1, 2 and 3 (i.e., the dry film application direction represented by arrow X6). Such an acute angle substantially prevents air from being confined between the dry film applied for forming the blue color layer (final color layer) and the base plate.

In FIG. 8, the end of the green color portion 2 is shown to extend from the display area 70 to the border area 72 and to have an acute angle with respect to the dry film application direction. Alternatively, an end of the green color portion 2 in the frame area 73 can be formed to have an acute angle with respect to the dry film application direction (not shown). The structure shown in FIG. 8 is more effective in preventing air from being confined between the dry film and the base plate.

As described above, in this example, the red color portions 1 and the green color portions 2, which are formed prior to the blue color portions 3, are arranged so that the gaps 31 extended from one side of the base plate to another side opposed to the one side are branched in the frame area 71. Due to such an arrangement, when the blue color portions 3 are applied on the gaps 31, air is expelled without being confined between the dry film for the blue color portions 3 and the base plate. Accordingly, air bubbles are not typically generated, which prevents delamination of the dry film. Forming the green color portions 2 so as to have an acute angle in the direction in which the dry films are applied is useful in preventing generation of air bubbles.

The blue color portions 3 which are thinner than the color portions of the other colors in the seal area 73 increase the distance between the two substrates in the seal area 73 and thus alleviates the pressure applied on the sealing material. Thus, the sealing material is prevented from exuding when the two substrates are assembled together.

EXAMPLE 6

Figure 9:
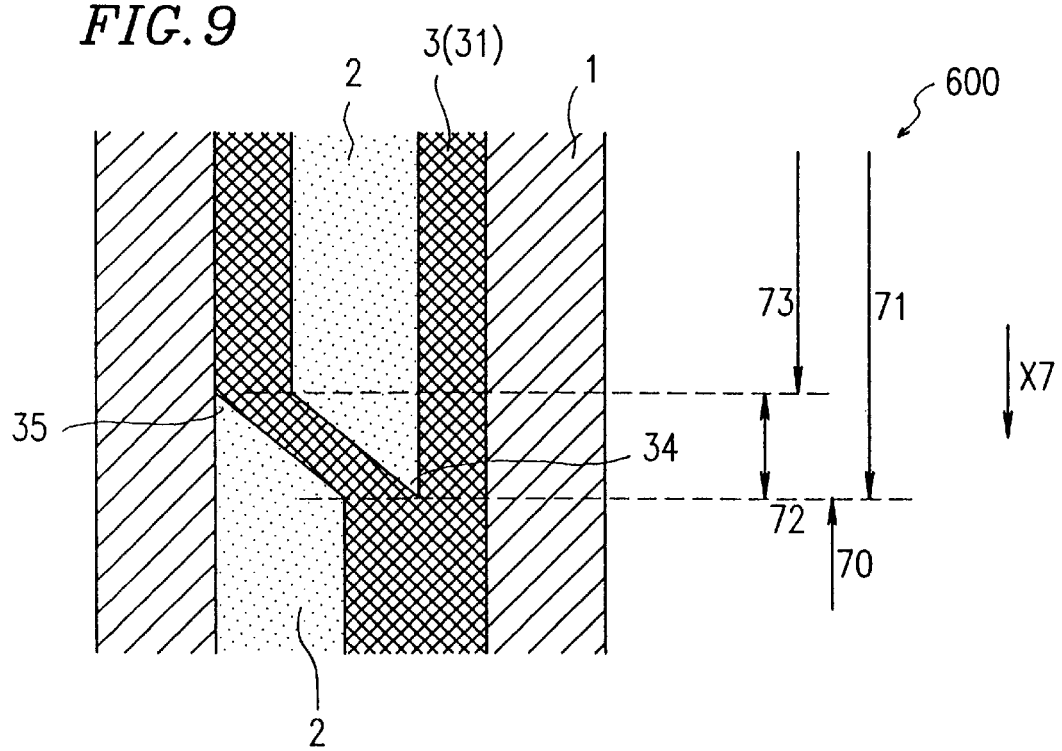
FIG. 9 is a partial plan view of a color filter substrate according to a sixth example of the present invention.

A color filter substrate 600 according to a sixth example of the present invention will be described with reference to FIG. 9. The color filer substrate 600 is produced in the same manner as in the fifth example, except that, as shown in FIG. 9, the red portions 1, the green portions 2 and the blue portions 3 occupy equal areas in each of the seal area 73 and the border area 72. Such an arrangement is performed in order to avoid chromatic non-uniformity in the light reflected by the light-blocking pattern provided on an active matrix substrate which is combined to the color filter substrate 600 to produce a liquid crystal display device. In more detail, the light-blocking pattern is provided in an area of the active matrix substrate corresponding to the border area 72 of the frame area 71.

As described in the fifth example, the color portions are provided on the frame area 71 of the color filter substrate 600 in order to cover the lustrous metal layer in the active matrix substrate. Light incident on the color filter substrate 600 is attenuated by transmission through the color filter layer and reaches the metal layer. The light is reflected by the metal layer and further attenuated by another transmission through the color filter layer. Thus, the light reflection visually recognized is restricted. In the case where the red, green and blue color portions in the color filter layer occupy equal areas, the color filter layer acts as a light reducing filter having no chromatic non-uniformity. Accordingly, the reflected light is not colored.

In the arrangement shown in FIG. 7, only the red and green color portions 1 and 2 are provided and no blue color portion is provided in the border area 72. In the arrangement shown in FIG. 8, the area of the green color portion 2 is significantly smaller than the areas of the red and blue color portions 1 and 3. In these arrangements, the reflected light is colored in accordance with the area ratio of the color portions 1, 2 and 3 with respect to one another. In the sixth example, the red, green and blue color portions 1, 2 and 3 are arranged to occupy equal areas in the border area 72 in order to solve such a problem.

Moreover, in the sixth example, as shown in FIG. 9, the green color portion 2 in the display area 70 extends to the border area 72, and an end thereof forms an acute angle with respect to the longitudinal direction of the green portions 2 (i.e., the dry film application direction represented by arrow X7) in the border area 72. Thus, the green color portion 2 has a vertical angle 34. The green color portion 2 in the frame area 71 also extends to the border area 72, and an end thereof has an acute angle with respect to the dry film application direction represented by arrow X7 in the border area 72. Thus, the green color portions 2 has a vertical angle 35.

In the display area, the red, green and blue portions 1, 2 and 3 are arranged to appear to have equal areas when seen in the direction perpendicular to the dry film application direction.

In the case where the light reflected by the light-blocking pattern provided on the active matrix substrate and incident on the frame area 71 is already chromatically non-uniform, such non-uniformity can be compensated for by adjusting the area ratio of the color portions 1, 2 and 3 in the frame area 71. This will be described with reference to FIG. 10.

Figure 10:
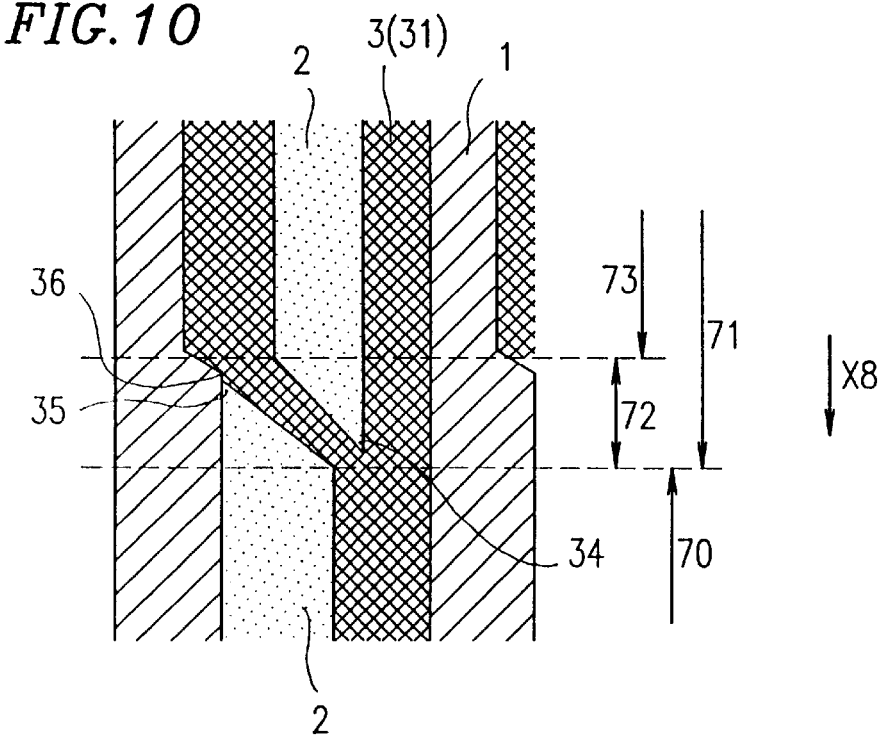
FIG. 10 is a partial plan view of an alternative color filter substrate according to the sixth example of the present invention.
Figure 11:
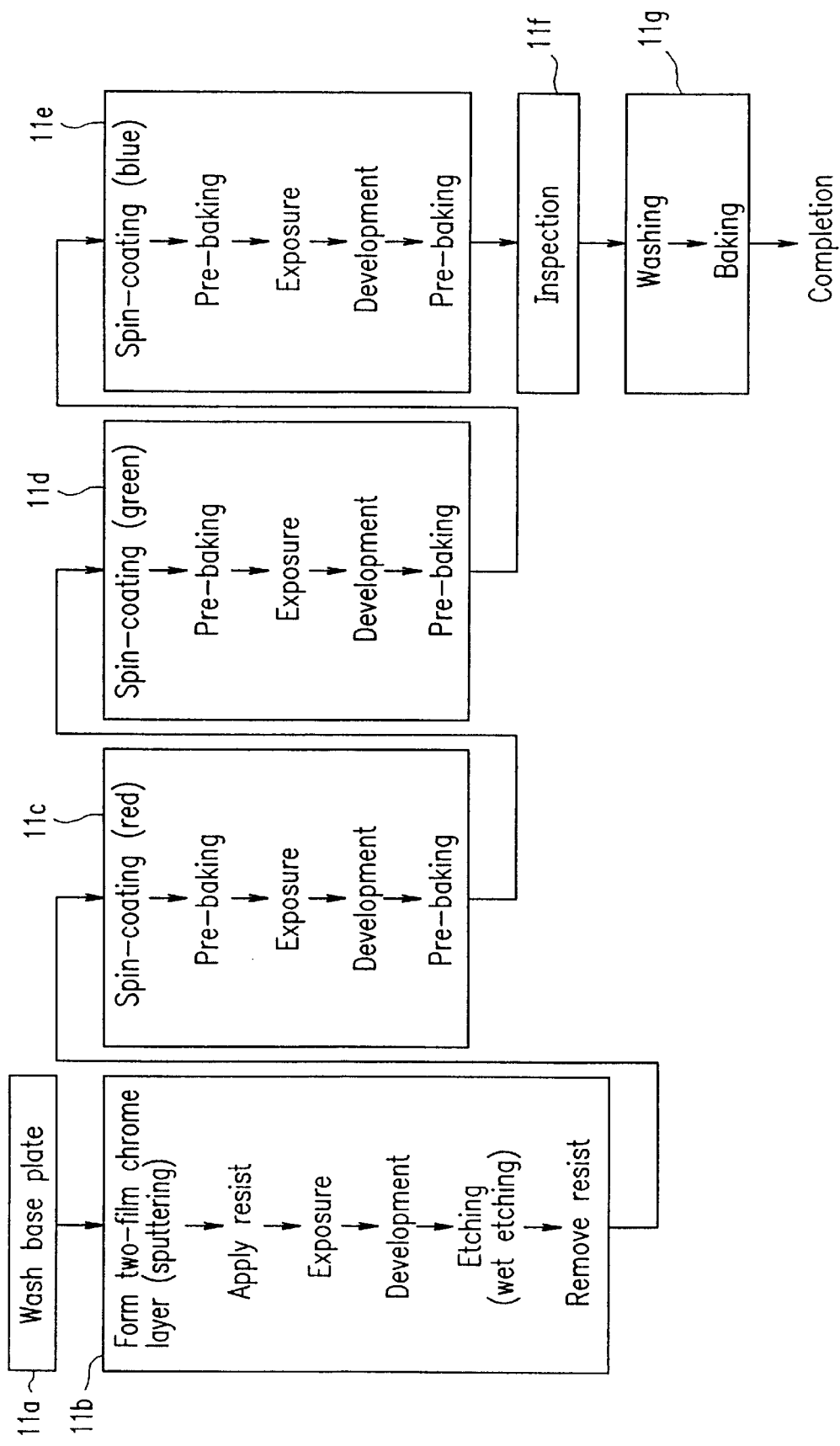
FIG. 11 is a chart illustrating a conventional method for producing a color filter substrate.
Figure 12:
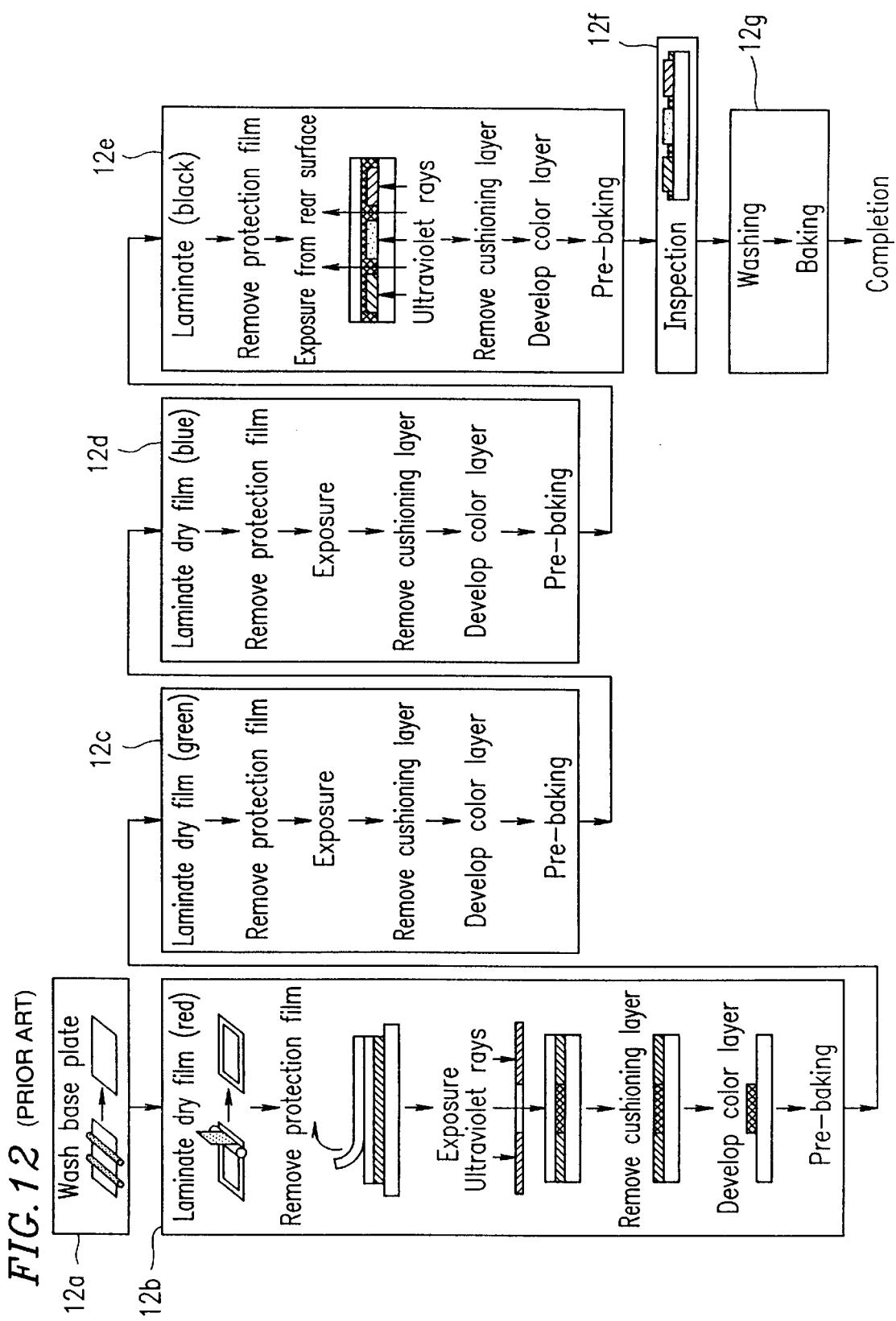
FIG. 12 is a chart illustrating another conventional method for producing a color filter substrate.

As shown in FIG. 10, a downstream end of the green color portion 2 extending from the seal area 73 to the border area 72 is formed to be slanting with respect to the dry film application direction represented by arrow X8 to have a vertical angle 34, and an upstream end of the green color portion 2 extending from the display area 70 to the border area 72 is formed to be slanting with respect to the dry film application direction represented by arrow X8 have a vertical angle 35. Furthermore, in the border area 72, the total width of the gap 31 perpendicular to the dry film application direction gradually increases from the downstream side to the upstream side. The total width of the gap 31 is constant in the display area 70 and also in the seal area 73. The red portion 1 is formed to have a stepped portion 36.

In the arrangement shown in FIG. 10, the areas of red, green and blue color portions 1, 2 and 3 are different between in the frame area 71 and in the display area 70. In the seal area 73, the areas of the red, green and blue portions 1, 2 and 3 are different from one another. In the border area 72, the areas of the red, green and blue color portions 1, 2 and 3 discontinuously change. Such a discontinuous change prevents visual recognition of reddish purple light in the direction perpendicular to the longitudinal direction of the color portions 1, 2 and 3. Thus, the frame 71 and the display area 70 appear to be continuous.

In this example also, when the blue color portions 3 are applied on the gaps 31, air is expelled without being confined between the dry film for the blue color portions 3 and the base plate. Accordingly, air bubbles are not generated, which prevents delamination of the dry film.

The blue color portions 3 which are thinner than the color portions of the other colors in the seal area 73 increases the distance between the two substrates in the seal area 73 and thus alleviates the pressure applied on the sealing material. Thus, the sealing material is prevented from exuding when the two substrates are assembled together.

The first through sixth examples are described regarding an active matrix substrate using TFTs as switching devices. The present invention is applicable to a liquid crystal display device including MIM (metal insulator metal) devices as switching devices.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a color filter substrate, the color filter substrate including a base plate having a first side and a second side opposed to the first side, and a color filter layer provided on the base plate and including at least a first color layer having a plurality of first color portions and a second color layer having a plurality of second color portions, the at least the first color layer and the second color layer including a final color layer, the plurality of first color portions and the plurality of second color portions being respectively adjacent to each other, the method comprising the step of forming a color filter layer which includes a repetition of the steps of:

applying a dry film on the base plate from the first side to the second side of the base plate while pressing the dry film by a laminate method; and patterning the dry film applied on the base plate, thereby forming a color layer including a plurality of color portions, wherein the final color layer is formed on at least a part of exposed surface areas extending from the first side to the second side, and wherein the dry film for forming the final color layer is applied while expelling air from between the dry film and the base plate through the exposed surface areas.

2. A method according to claim 1, wherein the step of forming the color filter layer includes the step of forming a plurality of sub color filter sections each including one of the plurality of first color portions and one of the plurality of second color portions which are adjacent to each other, the sub color filter sections being formed to keep an exposed surface area along the first side, wherein the final color layer is formed in exposed surface areas between the sub color filter sections and an exposed surface area along the first side, and wherein the dry film is applied while expelling air from between the dry film and the base plate through the exposed surface areas between the sub color filter sections and the exposed surface area along the first side.

3. A method according to claim 2, wherein the step of forming the plurality of sub color filter sections includes the step of projecting an end of at least one of the plurality of sub color filter sections.

4. A method according to claim 2, wherein the step of forming the plurality of sub color filter sections includes the step of forming a red color layer, a green color layer and a blue color layer; and the final color layer is formed as a light-blocking layer.

5. A method according to claim 1, wherein the step of forming the color filter layer includes the step of forming red color portions, green color portions and blue color portions; and the final color layer is formed as a light-blocking layer between each adjacent portion of the red color portions, the green color portions and the blue color portions.

6. A method according to claim 5, wherein at least one of the red color portions, the green color portions and the blue color portions is formed to have a side which forms an acute angle with respect to a dry film application direction.

7. A method for producing a color filter substrate, the color filter substrate including a base plate having a first side and a second side opposed to the first side and including a display area and a frame area surrounding the display area, and a color filter layer provided on the base plate and including at least a first color layer having a plurality of first color portions and a second color layer having a plurality of second color portions, the at least the first color layer and the second color layer including a final color layer, the plurality of first color portions and the plurality of second color portions being respectively adjacent to each other in the display area, the method comprising the step of forming a color filter layer which includes a repetition of the steps of:

applying a dry film on the base plate from the first side to the second side of the base plate while pressing the dry film by a laminate method, and patterning the dry film applied on the base plate, thereby forming a color layer including a plurality of color portions, wherein the final color layer is formed on at least a part of exposed surface areas extending from the first side to the second side and arranged in a branched manner in the frame area, and wherein the dry film for forming the final color layer is applied while expelling air from between the dry film and the base plate through the exposed surface areas.

8. A method according to claim 7, wherein the frame area includes a seal area and a border area located between the seal area and the display area, and the step of forming the color filter layer includes the step of forming the first color portions in the display area and the first color portions in the frame area so that at least one of opposing ends thereof forms an acute angle with respect to a dry film application direction in the border area.

9. A method according to claim 7, wherein the step of forming the color filter layer includes the step of forming the first color portions and the second color portions such that the first color portions and the second color portions occupy substantially equal areas in the seal area.

10. A method according to claim 9, wherein the step of forming the color filter layer includes the step of forming the first color portions and the second color portions such that the first color portions and the second color portions occupy substantially equal areas in the border area.

11. A method according to claim 7, wherein the step of forming the color filter layer includes the step of forming the second color portions so as to have a smaller thickness than that of the first color portions in the seal area.

12. A color filter substrate, comprising:

a base plate including a display area and a frame area surrounding the display area; and a color filter layer provided on the base plate and including at least a first color layer having a plurality of first color portions and a second color layer having a plurality of second color portions, wherein the plurality of first color portions and the plurality of second color portions are respectively adjacent to each other in the display area, and wherein the plurality of second color portions are provided between the plurality of first color portions and arranged in a branched manner in the frame area.

13. A color filter substrate according to claim 12, wherein the frame area includes a seal area and a border area located between the seal area and the display area, and at least one of opposing ends of the first color portions in the display area and the first color portions in the frame area forms an acute angle with respect to a dry film application direction in the border area.

14. A color filter substrate according to claim 12, wherein the first color portions and the second color portions occupy substantially equal areas in the seal area.

15. A color filter substrate according to claim 14, wherein the first color portions and the second color portions occupy substantially equal areas in the border area.

16. A color filter substrate according to claim 12, wherein the second color portions have a smaller thickness than that of the first color portions in the seal area.

* * * * *